United States Patent
Basset et al.

(10) Patent No.: US 10,866,419 B2
(45) Date of Patent: Dec. 15, 2020

(54) OPTICAL COMBINER AND APPLICATIONS THEREOF

(71) Applicant: CSEM Centre Suisse d'Electronique et de Microtechnique SA-Recherche et Développement, Neuchâtel (CH)

(72) Inventors: Guillaume Basset, Huningue (FR); Giorgio Quaranta, Saint Louis (FR)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 217 days.

(21) Appl. No.: 16/076,060

(22) PCT Filed: Dec. 20, 2016

(86) PCT No.: PCT/EP2016/082041
§ 371 (c)(1),
(2) Date: Aug. 7, 2018

(87) PCT Pub. No.: WO2017/137127
PCT Pub. Date: Aug. 17, 2017

(65) Prior Publication Data
US 2020/0096767 A1 Mar. 26, 2020

(30) Foreign Application Priority Data
Feb. 9, 2016 (EP) .................................. 16154813

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0036* (2013.01);
(Continued)

(58) Field of Classification Search
None
See application file for complete search history.

(56) References Cited

U.S. PATENT DOCUMENTS 3,059,519 A 10/1962 Stanton
5,420,947 A 5/1995 Li et al.
(Continued)

FOREIGN PATENT DOCUMENTS

EP 0455067 A2 11/1991
EP 1031828 A1 2/1999
(Continued)

OTHER PUBLICATIONS

Hessel, A., et al., "A New Theory of Wood's Anomalies on Optical Gratings," Applied Optics, Oct. 1965, p. 1275-1297, vol. 4, No. 10.
(Continued)

*Primary Examiner* — Chad H Smith
(74) *Attorney, Agent, or Firm* — Pearne & Gordon LLP

(57) ABSTRACT

An optical combiner including an array of pairs of resonating waveguide gratings. The waveguiding layer of the array, which includes the resonating waveguide gratings, is configured to guide at most ten guided light modes in the visible wavelength range. At least a portion of the resonating waveguide grating array is configured to incouple a portion of incident light on the array and to outcouple a fraction of that incident light. The outcoupled fraction has a predetermined wavelength λ in the visible and near-infrared wavelength range and has a predetermined spectral width Δλ. The optical combiner is preferably configured to be used in a near-eye display apparatus. The invention is also achieved
(Continued)

by a near-eye display apparatus that is adapted to combine projected images provided by a light emitter with light provided by a scene observed by an observer looking through the optical combiner.

55 Claims, 27 Drawing Sheets

(51) Int. Cl.
G02B 27/10 (2006.01)
G06F 3/01 (2006.01)

(52) U.S. Cl.
CPC ......... *G02B 27/1086* (2013.01); *G06F 3/013* (2013.01); *G02B 2027/0118* (2013.01); *G02B 2027/0178* (2013.01)

(56) References Cited

U.S. PATENT DOCUMENTS

| | | | |
|---|---|---|---|
| 5,738,825 | A | 4/1998 | Rudigier et al. |
| 8,472,119 | B1 | 6/2013 | Kelly |
| 2012/0075168 | A1 | 3/2012 | Osterhout et al. |
| 2013/0250431 | A1 | 9/2013 | Robbins et al. |
| 2015/0016777 | A1 | 1/2015 | Abovitz et al. |
| 2015/0241703 | A1 | 8/2015 | Schowengerdt |
| 2015/0309263 | A2 | 10/2015 | Abovitz et al. |
| 2015/0362734 | A1 | 12/2015 | Moser et al. |
| 2016/0327789 | A1 | 11/2016 | Klug et al. |
| 2016/0334629 | A1 | 11/2016 | Mukawa |
| 2016/0356956 | A1* | 12/2016 | Davoine .................. G02B 6/34 |

FOREIGN PATENT DOCUMENTS

| | | |
|---|---|---|
| EP | 1739751 A1 | 6/2005 |
| EP | 2618130 A1 | 1/2012 |
| EP | 2757374 A1 | 1/2013 |
| EP | 2631695 A1 | 2/2013 |
| WO | 9219976 A1 | 11/1992 |
| WO | 2015096859 A1 | 7/2015 |

OTHER PUBLICATIONS

Davoine, et al., "Resonant absorption of a chemically sensitive layer based on waveguide gratings," Applied Optics, Jan. 20, 2013, p. 340-349, vol. 52, No. 3.
Magnusson, R., et al., "New principle for optical filters," American Institute of Physics, Aug. 31, 1992, p. 1022-1024.
Rosenblatt, David, et al., "Resonant Grating Waveguide Structures," IEEE Journal of Quantum Electronics, Nov. 1997, p. 2038-2059, vol. 33, No. 11.
Sharon, A., et al., "Resonant grating-waveguide structures for visible and near-infrared radiation", Optical Society of America, Nov. 1997, p. 2985-2993, vol. 14, No. 11.
Wood, "Uneven Distribution of Light in a Diffraction Grating Spectrum," p. 396-402.
International Search Report for PCT/EP2016/082041 dated Mar. 30, 2017.
Written Opinion for PCT/EP2016/082041 dated Mar. 30, 2017.

\* cited by examiner

OPTICAL COMBINER AND APPLICATIONS THEREOF

FIELD OF THE INVENTION

The invention relates to the field of optics and in particular, but not exclusively, to near-to-eye optical systems. More particularly the invention relates to optical systems that are based on arrays of resonating grating elements and to virtual image display apparatus that are suitable for head-mounted displays mounted on the head of an observer.

BACKGROUND OF THE INVENTION

Resonant waveguide gratings (defined as RWG hereafter, also called resonating waveguide gratings), also called leaky-mode waveguide, low-modes waveguide gratings, subwavelength waveguide gratings, zero-order devices and guided-mode resonance filters or devices, and comprising monomode waveguide gratings, have been developped since more than 30 years.

Gratings have also been used widely as devices to disperse and filter optical beams. The combination of gratings and waveguides has been proposed to make optical structures and devices with unique properties such as filters having very narrow bandwidths. More particularly a considerable amount of development work has been made in the field of resonating waveguide gratings as they allow producing particularly interesting optical effects that cannot be realized with classical optical components.

A resonant waveguide grating, also called guided-mode resonance filter, consists of a combination of a subwavelength grating and a thin waveguide. Such structures have a multilayer configuration and a basic arrangement comprises a substrate, a thin dielectric or semiconductor or metallic waveguiding layer and possibly an additional layer in which a grating is formed. A so called resonance occurs when the incident light is diffracted by the grating and matches a mode of the waveguide. As most of the spectrum does not couple into the waveguide, strong spectral changes are observed in reflection and transmission. Because the waveguide is intrinsically corrugated being a waveguide-grating, the guided modes are necessarily leaky, a fraction of the guided light is outcoupled travelling through each grating period while another portion is incoupled under suitable impending light.

RWG are generally designed to have spatial periodicity shorter than the wavelength they operate with and are therefore called "subwavelength" structures or subwavelength devices. Eventually they have periodicities closed to the wavelength they are operating with and just above it. Quite often, the periods are significantly smaller than the free-space waveglength they are working with, for example a third of it. Because of their small periodicity, they do not allow various diffractive orders, which distinguishes them from diffractive optical elements (DOE) such as surface relief grating (SRG), Holographic Optical elements (HOE) such as volume holograms and Switchable Bragg Grating (SBG). Most of the time, they are designed to operate only in zero-diffractive order, which allows light filtering and redirection only between the zero-order transmission and reflection, this last one is also called specular reflection, and with a leaky-guided mode incoupled and outcoupled continuously, eventually with non-guided plus or minus first diffraction order, exceptionally with non-guided plus or minus second diffraction order.

The existence of such resonances have been discovered in the earlier stages of grating developments (R. W. Wood, Phil. Mag. vol 4, pp. 396-402, 1902). These resonances belong to one type of the anomalous diffraction phenomena in grating structures and imply a rapid variation in the external observable diffracted orders with respect to physical parameters such as the angle and/or the wavelength of the incident wave. In the early stages of grating manufacturing the abrupt change of reflection could not be explained. Hessel and Oliner (Appl. Optics, vol. 4, pp. 1275-1297, 1965) pointed out that there are basically two types of grating anomalies. One is called the Rayleigh type, which is the classical Wood's anomaly, and another is called the resonance type. The Rayleigh-type anomaly is owing to the energy of higher diffracted order transferred to lower-orders through evanescent waves.

The resonance anomaly in diffraction gratings, being of particular interest in the context of the current patent application, is due to the coupling process of an externally incident optical wave to a surface guided wave which is supported by the structure of the resonant waveguide grating. Such grating anomalies can be divided into two types in function of the type of the structure and accurate results can be obtained by using the Fourier-Rayleigh approximation. This method cannot be applied in the case of deep grating grooves. Several authors investigated the reflection from weakly corrugated waveguides. The convergence problems of deep grating grooves could be relaxed by using the rigorous simulation methods such as the Fourier-Modal-Method (FMM) or the Rigorous Coupled-Wave Analysis (RCWA). With these new mathematical tools, many devices have been proposed and developed in the last decades.

Such resonant waveguide gratings based on dielectric and semiconductor waveguides and/or metallic waveguides have been developed for a variety of applications, such as described in U.S. Pat. No. 4,426,130 and many other patent from Karl Knop. The first industrial implementations were made under the brand DID™ as optical authentication devices, so-called optical variable devices (OVDs).

One of the main applications of guided mode resonance structures has been the design of filters with very narrow spectral linewidths in reflection and transmission. The bandwidth can de designed to be extremely narrow and of the order of 0.1 nm and may be tuned by parameters such as the grating depth, the duty cycle, the thickness and composition of the waveguide layer. Magnusson proposed wavelength selective reflection filters and investigated their line shapes (R. Magnusson and S. S. Wang: "New principle for optical filters", Appl. Phys. Lett., vol 61, pp. 1022-1024, 1992). Also, a systematic analysis of resonant grating waveguide structures has been published by Rosenblatt and Sharon:

D. Rosenblatt et al., "Resonating grating waveguide structures", IEEE J. Quantum Electron., vol. 33, nr. 11. pp. 2038-2059, 1997

A. Sharon et al.: "Resonating grating-wavegudie structures for visible and near-infrared radiation:", J. Opt. Soc. Am., vol. 14, nr. 11, pp. 2985-2993, 1997

Rosenblatt and Sharon explained in these papers that the efficient transfer of wave energy between forward and backward propagations at resonance is due to the relative phase-shift between the incident and the diffracted waves, resulting in destructive and constructive interference of forward and backward propagating waves.

Guided mode resonance devices may also be used as components in sensors. By applying a substance such as a gas or a bio-chemical layer in contact with the resonating waveguide, these substances may be detected. A limitation of guided mode resonance devices in sensors is that the interaction length of the waves interacting with said substances is limited due to the leaky-mode propagations.

Other developments using RWG as color filters for vision sensors are described in for example in EP1739751. However, the leaky-mode and light waveguiding properties of RWG were specifically used until recently only in optical sensing platforms, as described in U.S. Pat. No. 5,738,825 or EP0455067.

An example of the use of a resonating waveguide-grating as a sensor to detect the presence of a gas is described in the article of L. Davoine et al.:"Resonant absorption of a chemically sensitive layer based on waveguide gratings", Applied Optics, pp. 340-349, vol. 52, nr. 3, 2013.

In this device the major drawback is the inherent leakage of light along the waveguide, therefore the resonant light cannot be absorbed completely by the medium in contact with the waveguide. In addition a delicate trade-off has to be chosen between a possible absorption enhancement and the resonance bandwidth of the resonating waveguide-structure.

Because of many reasons, including limitations in technological fabrication, complex arrays of RWG using different incoupling and outcoupling RWGs connected by a common very thin waveguide were developed only recently as sensing platform as described in WO9219976 and EP1031828. This approached was described as well more recently in EP2618130 or in EP2757374 using coherent beam illumination and detection.

WO2015096859, describes a guided mode resonance that allows to perform a light beam redirection. This is achieved by using light incoupling in a "RWG incoupler" having a first spectral distribution, the incoupled light is then transmitetd to and decoupled by a neighbor "RWG outcoupler" at a non-specular or non-zero-order transmitted angle, simultaneously with the guidance in the opposite direction in the same waveguide of another spectral distribution, the "RWG incoupler" and "RWG outcoupler" being for this second spectral distribution respectively the "outcoupler" and "incoupler".

In parallel to these developments, triggered by mainly the disclosure of U.S. Pat. No. 3,059,519, many development have aimed at creating compact, light-weight and high quality near-eye head-mounted displays. These devices are especially semi-transparent displays, allowing to superpose visual information from a visible scene to an observer and by images provided by a computing platform. Such devices have been investigated intensively and are generally called augmented reality devices, smart-glasses and more recently mixed-reality devices.

Many different optical systems have been proposed to redirect the light created by a micro-display or microprojector towards the eye pupil of the optical projection system, while allowing the user to view the outside world. Merging high resolution color images, typically made by RGB components, without disturbing the natural field of view has been proven challenging. The optical device that can merge synthetic dynamic 2D or sometimes 3D images, defined as light-field dynamic images, with the external world light is named as a near-eye display "screen" or also an "optical combiner".

Many approaches have been proposed, based on freeform optics elements and/or highly multimode lightguides typically trapping light between two reflecting interfaces on which light rays are bouncing. In some technologies proposed, this function is made by complex semi-transparent micro-displays. To couple in and out of multimode lightguides light rays, diffractive optical elements, generically named Diffractive Optical Elements (DOE) have been often developped and proposed.

However, these diffractive elements are highly dispersive and are relatively broadband, creating so-called "rainbow-effect", possibly for both the external world light and computed images. This limits the application of diffractive optical elements as optical combiner mostly to outcouple light rays from lightguides, so that most of the diffracted light from the external world is diffracted and the lightguide, limiting the visual aberations. Various approaches have been proposed to reduce such effects, such as using volume holograms as disclosed in US2015362734.

Recent development are targeting to provide wide Field Of View (FOV) screens or combiners having a high lateral (XY) image resolution with a large RGB (reb, green, blue) gamut color, large exit pupil allowing users with various Inter-Pupillary Distance (IPD) to use the near-eye display and eye-ball movement without losing the image information, in compact, thin and lightweight form factors. Current limitations are, depending of the approaches used: chromatic dispersions, diffraction of light coming from the outside world, limited transparency, limited shape to planar waveguides used for Exit Pupil Expansion (EPE), limited FOV and difficult manufacturing fabrication/replications processes and fabrication tolerances.

A great number of patents have been filed in the field. Some patents from the main actors are cited here: Sony (US2016334629), Microsoft (US2012075168), Seiko (EP2631695), Google (U.S. Pat. No. 8,472,119), Canon, LG, Samsung, Olympus, and more recently Magic Leap (US2015016777, US2016327789). This last document, while claiming spatial light modulators used to represent dark virtual objects relates an extensive summary to the various optical elements used to realize NE-LFD.

SUMMARY OF THE INVENTION

The object of this invention is to disclose a new optical combiner suitable to realize near-eye display screens, near-eye light-field display screens, augmented reality systems using these combiners for at least one eye display. The invention relates also to a near-to-the eye display apparatus that comprises such an optical combiner.

The invention intends to provide a new optical combiner and near-to-the-eye display apparatus that solves the limitations by devices of prior art.

In particular, the new optical combiner described allow to realize screens which are highly transparent to the outside world and that avoid inherent optical aberrations of devices of prio art. For example the optical combiner of the invention can have a much thinner form-factor than the millimetric to centrimetric (eventually sub-millimetric) thick optical arrangements of devices of prior art. The optical combiner of the invention allows also to provide a large field of view and high resolution. Additionally, the optical combiner and the display apparatus of the invention is suitable for affordable mass-fabrication and to realize light-field displays.

In particular, the new optical combiner described takes benefit of the resonant coupling of light in RWG while allowing light-beam redirection through the use of at least two different RWG. This resonant coupling is intrinsically color-selective which allows color-specific light redirection. Preferably, the gratings are designed to be subwavelength to prevent direct—non-guided—diffraction. Such a configuration allows light-redirection only through the incoupling into resonant guided modes by a first RWG and outcoupling of the guided mode by a second RWG. Such guided modes can be designed to be limited in number of modes to a low number of modes. Eventually this can be limited to three, two or even down to a single mode which is the fundamental mode of a so-called monomode waveguide.

Configurations to prevent non-guided diffration are highly color and angular specific and therefore allow excellent transparency, neglictible parasitic diffraction and scattering, and so haze, while allowing a fully tunable light redirection. Configurations with very small grating periods prevent the RWG to create non-guided diffraction for the wavelength they are designed for, such that a single RWG cannot redirect an impeding light-beam away from its direct transmission, its specular reflection and the guided mode or modes. In these configurations, only a second RWG having a different grating orientation and/or spatial periodicity, so a different grating vector, can redirect light toward a different direction, by resonant outcoupling of the one or different guided modes.

The light incoupling can be fully engineered in a 3D configuration by chosing the orientation and period of the incoupling grating in accordance with the waveguiding layer to select for a given angle of incidence, or a set of angle of incidence the central wavelength of the resonantly incoupling light. The grating depth, also called the RWG corrugation, and the waveguiding layer permittivity cross-section and contrast with its environment, which may be the cladding or substrate of the RWG, can be modified to broaden or shorten the spectral width of the incoupled light as well as to increase or decrease the efficiency of the leaky-incoupling and the leaky-mode propagation distance.

The waveguiding layer permittivity cross-section can be engineered to allow a discreet amount of guided-light, whose modes can be only for a specific polarization, specifically transverse-electric or transverse-magnetic with respect to the waveguiding layer, it can be engineered to be symmetric or assymetric in permittivity cross-section to enhance incoupling and/or outcouling from/to a specific side, its permittivity cross-section can be engineered to obtain a specific waveguide-mode chromatic dispersion. As known by the man skilled in the art, in extremely thin— low-mode waveguides, the lightwave propagates in the waveguiding layer as well as in its immediate surrounding, different waveguided modes will experience different effective permittivity, so-called mode effective refractive-index, and their dispersion can be engineered to a large extent, which is much less possible for the chromatic dispersion of gratings. Both can be engineered to compensate for each other, as disclosed for example in U.S. Pat. No. 5,420,947. The waveguiding layer permittivity cross-section and in particular the contrast of its refractive index with the one of its immediate surrounding, the so-called cladding, can also be engineered to modify on the grating area the diffractive resonant coupling efficiency and its spectral-dependant efficiency.

The outcoupling grating can be fully engineered to outcouple and redirect portions of the waveguided light to any direction in a 3D configuration, especially by engineering its orientation and spatial periodicity in accordance with the waveguiding layer. As well as the incoupling grating, the outcoupling grating can be designed to be non-linear, as examples curved or segmented, so as to modify the wavefront and collimation of the redirected light perpendicular to the waveguiding propagation axis, the outcouping grating can be designed to have gradiant spatial periodicity to also modify the wavefront and collimation of the redirected light over the waveguiding propagation axis. The grating depth, also called the RWG corrugation, and the waveguiding layer permittivity contrast with its environment can be modified to broaden or shorten the spectral width of the outcoupled light as well as to increase or decrease the outcoupling efficiency. It can be designed to outcoupled light in various spatial location in various directions and collimation to create multiple beamlets, eventually interfering with each other given their common light source being in the guided light.

The many degrees of freedom in the design and engineering of optical combiner using pairs of RWG, and their intrinsic chromatic and angular specificity, allow many optical configurations, for example with complex lateral and vertical stacking while having extremely limited optical perturbations between various different arrangements as well as for the light impeding from the outside world. By arranging a plurality of pairs of RWG, an imaging optical combiner can be realized. Such combiners can be arranged to be multichromatic and to have provide a large color gamut, to have a high resolution defined perpendicular to the viewing direction, to provide various virtual image focal depth in the viewing direction in so-called light-field display configurations, to have extended exit pupils, to provide large FOV while being very thin, lightweight, possibly conformable to any 2D curves survace and being affordable for mass production.

More precisely, the invention is achieved by an optical combiner, defining a front side and a back side opposite to said front side comprising:
   a substrate layer;
   a waveguiding layer arranged on said substrate layer, having a predetermined permittivity function defined in the direction perpendicular to said waveguiding layer, and comprising an array of pairs of resonant waveguide gratings, each pair comprising a first resonant waveguide grating and a second resonant waveguide grating.

Said first resonant waveguide grating defines a first surface portion of said waveguiding layer having a first center and the second resonant waveguide grating defines a second surface portion of said waveguiding layer having a second center, said first center and said second center defining a local longitudinal axis W, and a resonant waveguide grating element center being defined halfway between said first center and said second center.

Said first and second resonant waveguide gratin being formed by respectively a first gratin and a second grating, each grating being arranged to an adjacent portion of said waveguiding layer.

Said first resonant waveguide grating being arranged to be in optical communication with said second resonant waveguide grating.

Said waveguiding layer is configured to guide at most ten guided light modes in the visible wavelength range, said visible wavelength range being defined as light having a wavelength between 370 nm and 800 nm.

Said first grating and second grating having different grating vectors.

Said first grating has a predetermined period and orientation and said permittivity function of the waveguiding layer is also chosen so that the said first resonant waveguide-grating element couples resonantly into said waveguiding layer an incoupled portion of an incident light beam, provided by a light emitter emitting a light beam, into at least one of said ten modes of the waveguiding layer.

Said second grating has a chosen period and orientation, and said permittivity function of the waveguiding layer is also chosen so that said second resonant waveguide-grating element couples outresonantly of said waveguide layer, to said back side, an outcoupled fraction of said at least an incoupled portion.

Said outcoupled fraction of said at least incoupled portion has a predetermined wavelength $\lambda$ in said visible and near-infrared wavelength range and has a predetermined spectral width $\Delta\lambda$.

The invention is also achieved by a near-eye display apparatus comprising:
the optical combiner as described;
an image generating apparatus;
a head fitting hardware on which said optical combiner and image generating apparatus are fixed.

BRIEF DESCRIPTION OF THE DRAWINGS

The above described objects and advantages of the present invention will become more readily apparent to those ordinarily skilled in the art after reviewing the following detailed descriptions and accompanying drawings, in which.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments of the optical combiner may be implemented in any device that comprises said optical combiner. More specifically the optical combiner may be implemented in a near-to-eye display apparatus.

Figure 1:
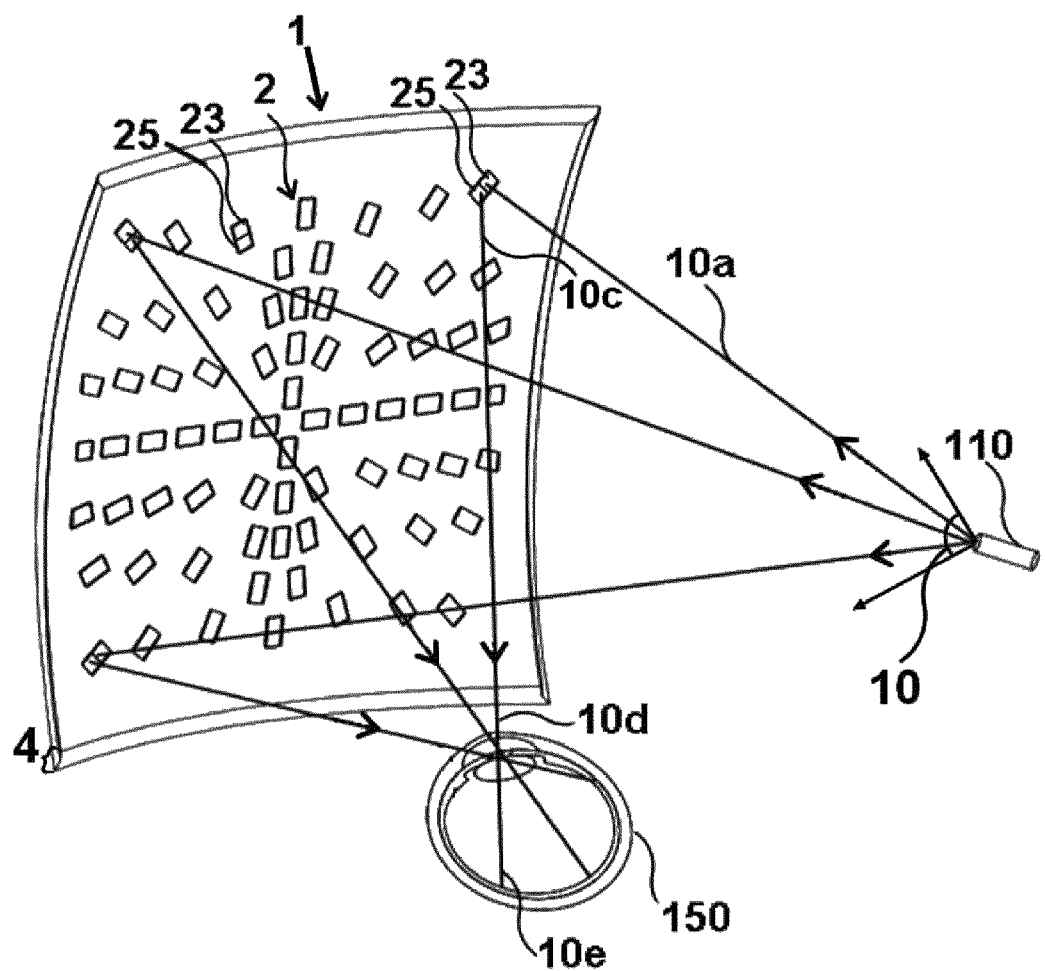
FIG. 1 illustrates an optical combiner of the invention.
Figure 23:
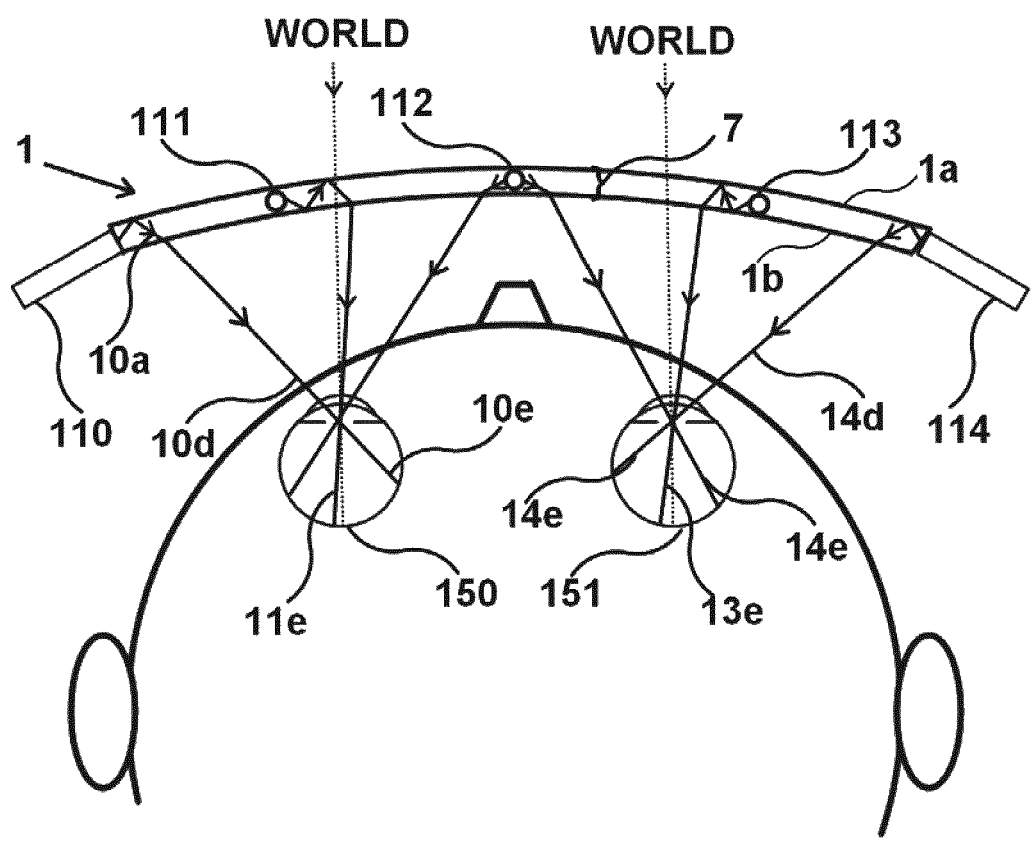
FIG. 23 shown an optical combiner comprising two different exit pupils in a configuration with light impeding from a lightguide.

The near-to-the-eye display apparatus 100 of the invention, also defined as display, comprises at least said optical combiner 1 and a light source, also defined as image projector, microdisplay or light emitter 110, as illustrated in FIG. 23. The light emitter 110 emits a light beam 10 in the direction of the optical combiner 1. The optical combiner 1 has a front side 1a situated to the side of a scene, defined as front side, and a back side 1b situated to the opposite site of said front side 1a, as illustrated in FIG. 1. As further described in detail, and illustrated in e.g. FIG. 1, the optical combiner 1 comprises an array 2 of resonating waveguide grating elements (23, 25). Resonating waveguide grating elements are also defined as resonating waveguide gratings (23, 25) or RWG's. At least a portion of the emitted light beam 10 is intercepted by at least one of the RWG pairs of said optical combiner 1. The incident light beam, also defined as incident imaging light beam, may comprise a plurality of incident light beams or scanned light-beams. At least a portion 10a of said incident light beams is incident on at least one of said resonating waveguide gratings. In the figures said portion 10a represents light incident on a RWG. The intensity of the light incident on each RWG of said array 2 may be different. A fraction of the total incident light on said array 2 is redirected by the optical combiner 1, in transmission or reflection thereof. This fraction or part of it may be transferred to the pupil of at least one eye 150 of an observer looking in the direction and through the optical combiner 1. In a variant this fraction may be redirected to an imaging system that comprises an entry pupil and an electronic imaging device such as a CCD vision circuit. At least a portion of said redirected light 10c is combined with light provided by a scene. A scene, also defined hereafter as WORLD, is defined as any object or part of a landscape that may be observed by an observer, such as a car, a person, a building, a light source, a tree. This allows to combine projected images provided by said light emitter 110 with the field of the environment perceived by the observer.

As further explained the optical combiner 1 may define an exit pupil 3. The collimation of the redirected light beam illuminating an exit pupil 3 of the optical combiner 1 requires a delicate design balance in order to be perceive by the eye of the observer, using visual accommodation, as originating from a given distance from the observer. The apparent image source location is called the virtual image position, its distance to the observer is called the image-plane distance to the observer.

In order to locate visually objects, the human vision system is using pictorial cues, motion paralla, dynamic occlusion and binocular retinal disparity as high level information and low-level perception depth cues, also called oculomotor perception, the accommodation of the eyes and the vergence of the two eyes. In order to realize so-called light field displays (LFD's), so that virtual images generated appear at a given virtual distance to an observer, it is of particular interest to use the vergence and accommodation without creating Vergence Accommodation Conflicts (VAC). This can be realized by sending to the eyes two different images of a scene matching the binocular appearance of this scene. To achieve this, the eyes vergence as well as the eye accommodation may be used, by sending optical beams having a collimation matching the light beams incoming from virtual objects at a finite distance, or mimicking this collimation. Such light beams are divergent light-beams and their wavefronts are non-planar but spherical, with the sphere center located at the virtual object location. In order to mimic such divergent light-beams, the light-beams directed to the pupils of the observer should be as closed as possible to such spherical light beams.

An alternative is to provide the observer eye with very thin light beams which appear in focus for various eye accommodations given their small cross-section. Typically, such small light-beams, called as well beamlets, are smaller in cross-section than the pupil of the eye of the observer. Using various non-parallel and divergent in respect to each other beamlets impeding on the eyes of an observer, it is possible to mimic divergent light beans as incoming to the eye from an object at a finite distance. Such set of beamlets can simulate for various eye accommodations the cone of light emitted by an object at a finite distance.

In addition to the previous listed requirements such as large FOV, the high transparency, the low distortion to light from the external world and the ability to prevent VAC or to provide light-field display to each eye, another critical aspect of such combiner is to provide a broad enough exit pupil 3. The exit pupil 3 of an optical combiner is defined as the location in space, or three-dimensional volume, through which the image redirected by the see-through optical combiner 1 can be observed. It should match approximately the location of the pupil of the eye of an observer, or at least a part of the eye pupil should be in the exit pupil. The volume of the exit pupil 3 is often called eye-box volume or eye-box dimension. However, defining this eye-box dimension is complex as an eye whose pupil is located at the edge of the eye-box will usually perceive a part of the scene but not all, so-called vignettage, or a lower brightness of the virtual objects displayed and so-on. Therefor the eye-box cannot be defined as a single physical dimension but can be measured in respect with specific criteria.

It is of interest to provide broad eye-boxes in near-eye display system for several reasons. First, head-sets or eyeware apparatus should not be aligned perfectly to the head and therefore the eye of the user. Additionally, different users or observers will usually have different inter-pupillary distance (IPD). Realizing a binocular near-eye display system therefore requires providing a way to measure the IPD combined with mechanical flexibility to allow to adjust the distance between the two exit pupils of such binocular display, or requires large enough exit pupil so that various user with different IPD can use the near-eye display. As example, the $5^{th}$ and $95^{th}$ percentile of the IPD of adult males in the USA are 55 mm and 70 mm. The average IPD of adult female and childs are lower than those of adult male. Third, when an observer is looking at a scene, if large motions are related to head movement, most movements are rotation of the eye-balls. Such gaze in different directions, both left-right and top-bottom is adding up to the vergence of the two eyes to make the eye-ball rotating. This in turns translate to eye pupil movement relative to a headset or eyeware, both left-right, top-bottom and in depth. Therefore, obtaining a large static exit pupil or a dynamically tuned exit pupil is critical to near-eye displays.

There are a great number of different variants to realize a near-to eye display apparatus 100 of the invention. In embodiments the light source, also defined as light emitter 110, is a light projector emitting a divergent beam 10. Preferably the light emitter 110 projects an image onto the optical combiner 1. In an embodiment the light source 110 may provide a light beam that is scanned over the surface of said optical combiner 1. In variants, as for example illustrated in FIG. 1 and FIG. 7, the light source 110 may be positioned, relative to said combiner 1, to the side of said scene or to the opposite side of said scene, i.e. to the side of the eye of the observer.

Figure 2:
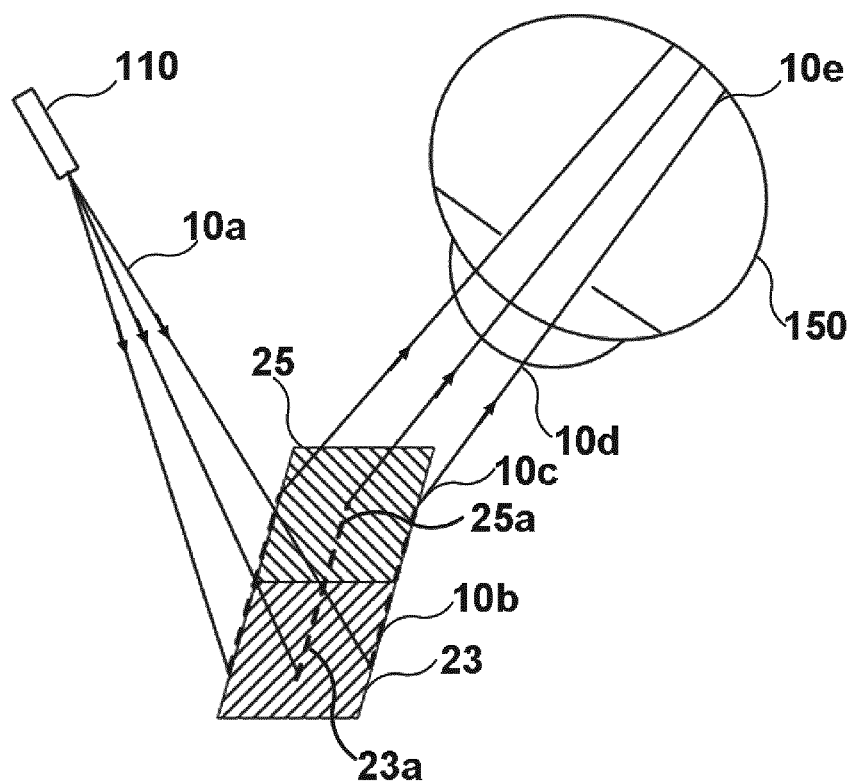
FIG. 2 magnified view of the incident and redirected light on a detailed portion of an optical combiner.
Figure 3A:
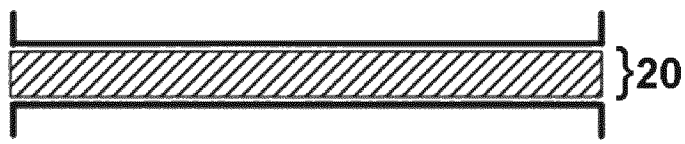
FIGS. 3a-3h illustrate different waveguiding layer configurations.
Figure 3B:
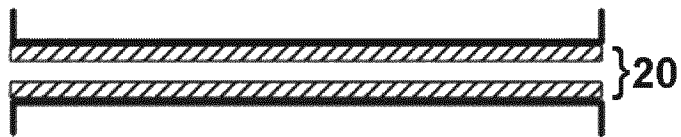
Figure 3C:
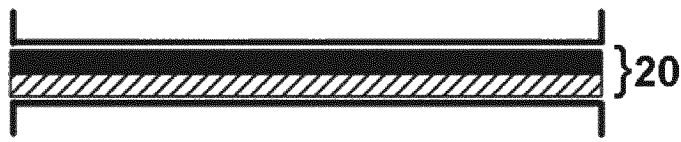
Figure 3D:
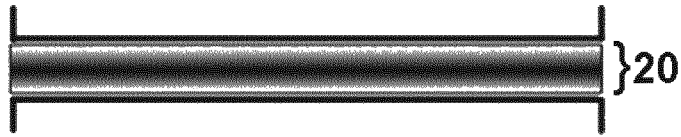
Figure 3E:
Figure 3F:
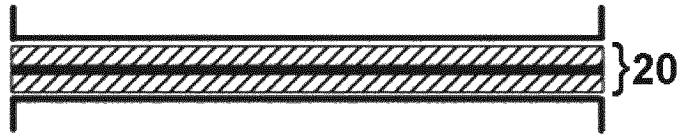
Figure 3G:
Figure 3H:
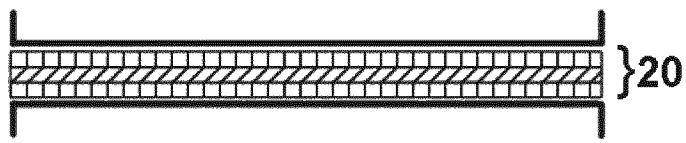

FIG. 1 illustrates an optical combiner 1 of the invention. FIG. 2 illustrates a magnified view of a detailed portion showing a RWG pair 23, 25 of the optical combiner 1.

The optical combiner 1 of the invention comprises:

a substrate layer 4 defined as the substrate on which, or in which, the array 2 of RWGs are fabricated, or later transferred, to assure at least part of the mechanical stability of the RWGs and the integration with the near-eye display apparatus 100. The substrate 4 is usually highly transparent and has low haze. The array 2 of RWGs can be fabricated on one or both surfaces of the substrate 4, or inside said substrate 4, for example on one or a plurality of inner interfaces being embedded by lamination or over-coating. The substrate 4 refers also to this possibly multilayer and transparent supporting sheet of material. The substrate has a front surface 4a and a back surface 4b opposite to said front surface 4a. Said front surface 4a faces said front side 1a of the optical combiner 1.

a waveguiding layer 20 arranged on said substrate layer 4, has a predetermined permittivity function, as further explained, which is defined in the direction perpendicular to said waveguiding layer, and comprises an array 2 of pairs of resonant waveguide gratings, each pair comprising a first resonant waveguide grating 23 and a second resonant waveguide grating 25.

Said first resonant waveguide grating 23 defines a first surface portion of said waveguiding layer 20 having a first center 23a, and the second resonant waveguide grating 25 defines a second surface portion of said waveguiding layer 20 having a second center 25a. Said first center 23a and said second center 25a define a local longitudinal axis W. A resonant waveguide grating element center 26 is defined halfway between said first center 23a and said second center 25a.

Said first and second resonant waveguide grating 23, 25 are in optical communication and are formed by respectively a first grating 22 and a second grating 24, each grating (22,24) being arranged to an adjacent portion of said waveguiding layer 20. The adjacent portions are located in close proximity to each other, usually less than 1 mm apart, preferably less than 100 µm apart and possibly touching each other, which means a groove and ridge of a first grating 22 is located right next to a groove and ridge of a second grating 24. Configurations wherein said first RWG 23 and second RWG 25 are located in direct contact and in proximity to each other are illustrated in FIGS. 4a and 4b.

Figure 4A:
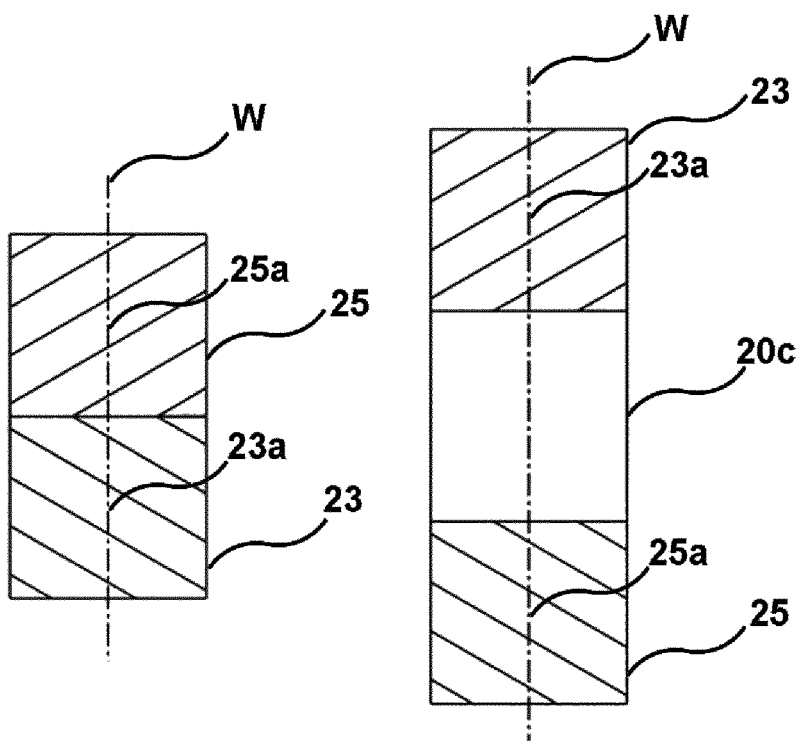
FIG. 4a illustrates two resonating waveguide grating pairs.

In FIG. 4a, an exemplary pair has said first RWG 23 and said second RWG 25 incontact, said first and second center 23a, 25a located as close as possible to avoid the two gratings from overlapping each other. FIG. 4a also illustrates another pairs of RWG with said first RWG 23 and said second RWG 25 located at a certain distance and separated by a waveguide portion 20c, so that the guided mode propagating along the axis W of the two pairs are travelling in opposite direction, respectively upward for the left pair and downwards for the right pair.

Figure 4B:
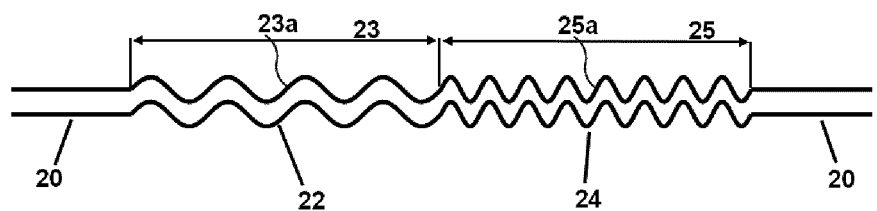
FIG. 4b illustrates two cross sections of resonating waveguide grating pairs connected through two waveguiding layers.
Figure 4B:
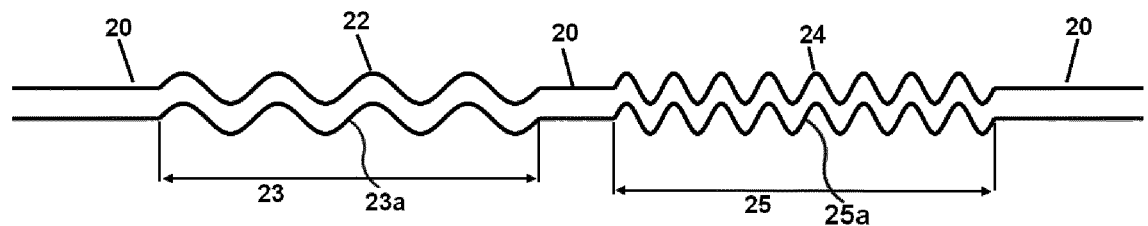

FIG. 4b illustrates possible cross-sections along the axis W of 2 pairs of a RWG. The FIG. 4b top cross-section representing the pair on the left in FIG. 4a and the FIG. 4b bottom cross-section representing the pair in FIG. 4a. The two cross-sections in FIG. 4b illustrate exemplary cross sections of the gratings 22, 24 and the RWGs 23, 25 of the RWG pairs of FIG. 4a. In FIG. 4b, the guided light is propagating from the left to the right in said waveguiding layer 20, although eventually one or multiple guided modes may propagate from the right to the left.

The waveguiding layer 20 is configured to guide at most ten guided light modes in the visible wavelength range, said visible wavelength range being defined as light having a wavelength between 370 nm and 800 nm, but can also be configured to guide non visible light such as near-infrared light whose wavelengths are larger than visible light for the human eyes. Typically Near-InfraRed (NIR) light is defined as the wavelength range between 750 nm and 1400 nm.

Said first grating 22 and second grating 24 are preferably different in spatial periodicity and/or orientation and therefore have different grating vectors.

The grating vectors are defined as the vector being normal to the grating groove direction and whose norm is equal to $K=2\times\pi/p$, p being the grating spatial periodicity. In non homogeneous gratings, non linear gratings, segmented gratings or non planar gratings located on a curved surface, the grating vector varies with the location on the grating surface. The orientation of the grating vector is defined by convention in one or another direction along the normal to the grating. By different grating vectors, two identical gratings whose grating vector's orientation would be defined in opposite directions are excluded, as two gratings having opposite grating vector with a symmetric profile would be identical.

Said first grating 22 has a chosen period and orientation, possibly homogeneous or non-homogeneous on its surface, and at the same time said permittivity function of the waveguiding layer across its thickness is chosen so that the said first resonant waveguide-grating element 23 couples resonantly into said waveguiding layer 20 an incoupled portion 10b of an incident light beam 10a into at least one of said ten modes of the waveguiding layer 20. Said incident light beam 10a is defined as a portion of said emitted light beam 10 by the light emitter 110, and more precisely defined as a light portion of the emitted light beam 10 that is incident on said first grating 23. Said second grating 24 have also a chosen period and orientation possibly homogeneous or non-homogeneous on its surface or, and said permittivity function of the waveguiding layer across its thickness is at the same time also chosen so that said second resonant waveguide-grating element 25 couples out resonantly at least an outcoupled fraction 10c of said at least an incoupled portion 10b.

The outcoupled fraction 10c of said at least incoupled portion 10b has a predetermined wavelength $\lambda$ in said visible and near-infrared wavelength range and has a predetermined spectral width $\Delta\lambda$.

It is understood that said light beams 10a, 10b, 10c represent the beams indicent, guided and outcoupled by a single resonating waveguide pair. In any optical combiner 1 of the invention there may be a huge number of resonating waveguide pairs, for example at least hundred thousands or more than 10 million of said pairs 2. Said pairs (23, 25) may be arranged in a periodic arrangement or in a particular arrangement such as a rectangular or a concentric cercle arrangement, a complex arrangement such as following conical curves or a random arrangement. As described further the array 2 may comprise subsets of RWG's that each have a particular arrangement. Said subsets may be arranged in different waveguiding layers or in a common waveguiding layer 20 in the optical combiner 1. Not all pairs of RWGs must necessarily be adapted to intercept an incident beam, or to guide or outcouple a light beam. In some configurations of use of the optical combiner only a fraction of said resonating waveguide gratings of said array 2 couple in light. As further described, the incoupling, guiding and outcoupling of light by the resonating waveguides is realized under specific conditions. For example, the optical combiner 1 may be arranged so that a central portion of said array 2 does not couple in and out any light, or couples in and out only light having a specific color, polarisation or providing from a specific light-emitter.

In the cases that the optical combiner 1 defines an exit pupil 3 as further described, the light beams 10a and 10c are chief rays.

In an embodiment said waveguiding layer 20 has, in order to incouple only a limited number of modes a thickness, defined perpendicular to said waveguiding layer 20, smaller than 2 µm, preferably smaller than 1 um, more preferably smaller than 500 nm and even more preferably smaller than 250 nm. The thickness of said waveguiding layer 20 is defined only by the guiding portion or core of said waveguiding layer 20 and not by the cladding or substrate surrounding said waveguiding layer 20. Said waveguiding layer 20 can be in a single or a multilayer made of different materials. The waveguiding layer 20 may comprise a gradiant index (GRIN) material such as a glass materials in which a dopant material is diffused. The waveguiding layer materials can comprise low and high refractive index materials, metals, metal oxide as well as materials with tunable optical permittivity such as liquid crystal and Kerr effect materials as well as composite of these materials. The waveguiding layer 20 is defined by its permittivity as a function of the position across the waveguiding layer 20, said permittivity function being defined perpendicular to said waveguiding layer 20. The permittivity function of the waveguiding layer 20 and its very low overall thickness allow only a finite number of guided modes which are trapped and guided in the layer apart from corrugated areas.

In an embodiment the distance between said centers 23a, 25a is less than 1 millimeter, preferably less than 200 µm, preferably less than 50 µm, more preferably less than 30 µm and eventually as small as smaller than 5 µm to have a density close to or smaller than the density of human cone cells on the retina of a possible observer. In order to achieve very high resolution, approximately of one pixel per angle of one arc-minute for the observer, said first and second gratings can be arranged in arrays of high spatial density. Said first and second gratings 23,25 are illustrated in some figures with a rectangular shape viewed perpendicular to the waveguiding layer. However, it is understood that such first and second gratings can be realized in any shape, as for example half-circle, elongated rectangular line, arc of a circle or arc of a conical curve such portion of a parabola or of an ellipse.

In an embodiment said first resonant waveguide-grating element 23 is arranged to couple resonantly into said waveguiding layer 20 at least a first incoupled portion 10b of an incident light beam 10a, the resonant incoupling forming a leaky mode in the first resonant waveguide-grating element 23 and/or the outcoupling mode in said second RWG 25 forms a leaky mode. Such leaky modes are defined by their progressive respectively in or out-coupling, which mean that after each grating period, a portion of the light beam is in or outcoupled in or out of the waveguiding layer 20. As example, such outcoupling can be exponentially decreasing along the grating periods of said second grating 25. A part of the incoupled light beam 10b by said first grating 23 is possibly not outcoupled by said second grating 25 and may be guided out of said grating pair 23, 25 of another grating pair of said array 2.

In an embodiment at least one of said incoupled portions 10b propagates in said waveguiding layer 20 in the fundamental mode of the waveguiding layer 20, this mode being either the fundamental, also defined as zero, transverse electric mode (TE0) or the fundamental transverse magnetic mode (TM0). This configuration allows to engineer a waveguiding layer 20 supporting only a single guided mode, the fundamental guided mode of said waveguiding layer 20. This is for example realized by using a very thin waveguiding layer 20, for example thinner than 200 nm or even preferably thinner than 100 nm. Therefore, by allowing a single mode in the waveguiding layer 20, the resonant light incoupling can occur in a single wavelength range from a first grating 22, allowing the pair of RWG 23, 25 not to redirect visible light out of this wavelength range. This enables excellent transparency in a broad spectral and angular range.

In an embodiment said waveguiding layer 20 is homogenous in the areas of said waveguiding layer 20 that comprise said array 2 of plurality of resonant waveguide grating elements. A common waveguiding layer material can be deposited, coated or diffused on a large array of pairs 2 of RWG elements without patterning it or modifying its composition and permittivity cross-section. As example, adjacent pairs 2 can be engineered to operate in different spectral band, such as Red, Green and Blue (RGB) using a common waveguiding layer 20 by modifying only the first and second gratings 22, 24. Especially, their orientation, spatial periodicity, depth and profile can be engineered and structured on a substrate and coated afterwards with a common waveguiding layer, such as by using vacuum or atmospheric deposition techniques. Examples of such techniques are Physical Vapor Deposition (PVD), sputtering, Chemical Vapor Deposition (CVD) in vacuum, wet coating, galvanic coating and diffusion doping at atmospheric pressure. Using a common waveguiding layer for a large array 2 of RWG allows to use cost-effective and high throughput fabrication methods. As example, all the gratings profiles, depths, periodicities and shapes can be replicated as complex surface structures using Nano Imprint Lithography (NIL) and be coated massively parallel and without fine patterning by a PVD coating. In an identical the waveguiding layer can be made of a plurality of materials as described above, the plurality of materials being homogeneous on an array 2 of RWG. This homogeneity of the waveguiding layer 20 does not mean that the waveguiding layer 20 is not corrugated. Of course when corrugated by a grating profile, the waveguiding layer material or materials will follow this corrugation, in a conformal or not conformal manner depending of the fabrication method used.

Examples of possible waveguiding layer composition are illustrated in FIG. 3a-3h with respectively, a single high refractive index (HRI) material (3a), two HRI material layers separated by a low or medium refractive index material (3b), a metal layer combined with a HRI material (3c), a gradient refractive index (GRIN) waveguiding layer (3d), a thin metallic waveguiding layer, also called plasmonic waveguide (3e), two HRI materials separated by a thin metallic layer (3f), two thin metallic layer separated by a HRI material (3g), two low refractive index material separated by a high refractive index material (3h). The permittivity function of the compositions of waveguiding layer 20 is defined as the function whose value is the local material permittivity as a function of the position on the axis perpendicular to said waveguiding layer 20. Examples of permittivity functions for high refractive index based RWG are for examples presented in the document EP2447744, especially in FIG. 2 to FIG. 7. The permittivity function of the waveguiding layer 20 alone is defined on a non-corrugated area, away from a grating structure.

The examples of FIG. 3a-3h illustrate various possible materials to realize thin optical waveguiding layer 20. These various waveguiding materials create different permittivity cross-sections function for the waveguiding layer. As the electromagnetic field propagation of the light of guided modes varies with the wavelength of the guided light, different wavelengths experience different effective mode refractive indices when guided by these different waveguiding layers. The so-called mode dispersion can therefore be selected by choosing the permittivity cross-section function and therefore the waveguiding layer materials as best suited to obtain a desired modal spectral dispersion.

In an embodiment said incoupled portion 10b is incoupled according to a low diffraction mode of said first grating 22, preferably either the +1 or −1 diffraction order. This preferable configuration allows to using small period gratings and especially subwavelength period gratings. Said incoupling grating 22 can be designed to be able to operate only with said positive first or said minus first diffraction order, excluding larger diffractive order such as a positive second or minus diffraction order from appearing. In addition, this positive or minus first diffraction order can be further limited to be enabled only in the waveguiding layer 20 and not in the substrate material. This is possible by using a waveguiding layer 20 having mode effective refractive index or indexes higher than the refractive index of the substrate, for respectively a monomode or non monomode waveguiding layer 20.

By limiting the number of possible diffraction order in the wavelength range of interest, in the visible or NIR ranges, chromatic aberrations and diffraction in the field of view of a scene by an observer can be avoided.

Figure 5A:
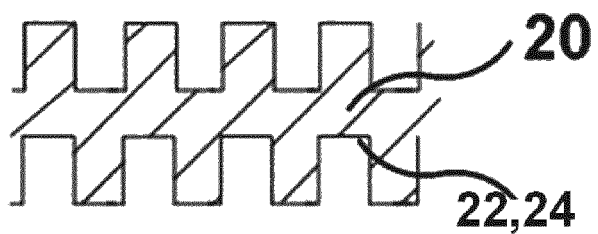
FIGS. 5a-5e illustrate different types of grating structures of a resonating waveguide grating.

This embodiment can also be used advantageously for said outcoupling grating 24, the plus first or minus first diffraction order being used for the outcoupling of light from the waveguiding layer 20. Example of profiles of such small-period gratings 22, 24 are illustrated in FIG. 5a to FIG. 5e. FIG. 5a illustrates a rectangular or binary grating profile. In this example, the grating duty-cycle, representing the width of the ridges compared to the grating period is balanced, which equals a duty-cycle of around 50%. Binary gratings with unbalanced duty-cycle, while not represented here can be used advantageously for their higher spectral and angular selectivity.

FIG. 5a illustrates a relatively shallow grating, the grating depth being smaller than the waveguiding layer 20 thickness.

Figure 5B:
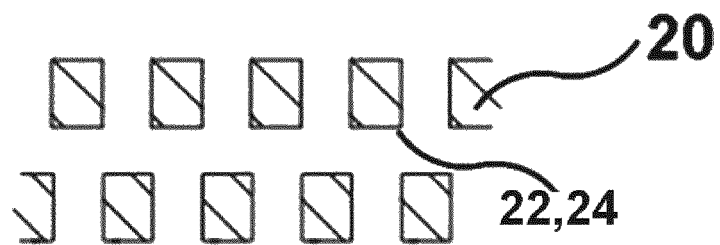

FIG. 5b represents a binary grating with a grating depth larger than the waveguiding layer 20 thickness. The waveguiding layer is discontinuous at a subwavelength scale which does not prevent it to guide light having typically a wavelength larger than the grating period and preferably larger than the grating depth.

Figure 5C:
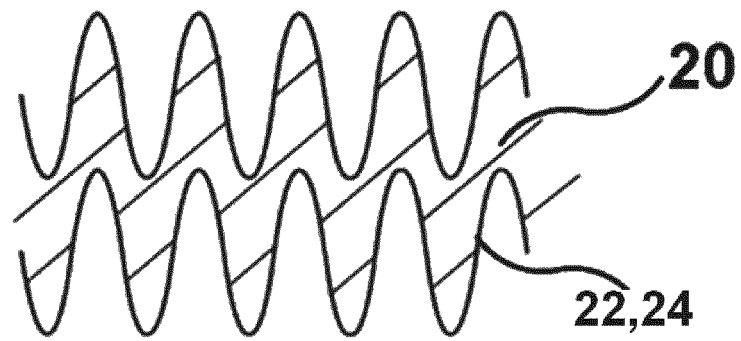

FIG. 5c illustrates a sinusoidal grating profile of the first and second gratings 22, 24.

Figure 5D:
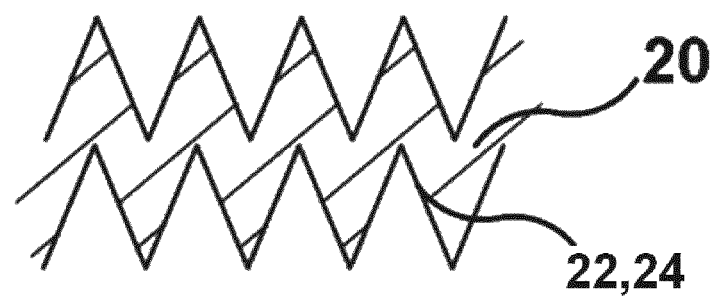

FIG. 5d illustrates a triangular symmetric grating profile.

Figure 5E:
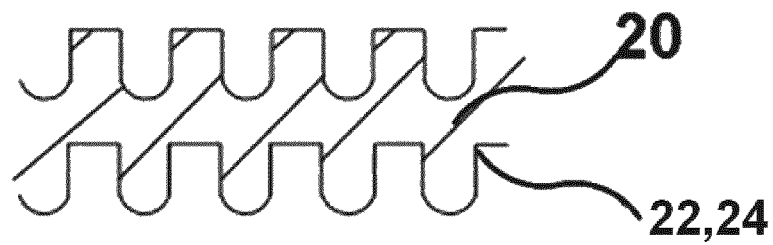

FIG. 5e illustrates a grating profile obtained often for subwavelength grating obtained from holographic, UV lithography or e-beam exposure followed by dry etching techniques to deepen then and after a few steps of tooling and replication.

The grating shape illustrated in FIG. 5e is neither binary, neither cycloid nor sinusoidal. This illustrates a possible grating shape among many other possible grating shape than can be designed and simulated using numerical solving methods and fabricated. The grating shape will impact the RWG performance at a constant grating period by modifying the RWG coupling efficiency, spectral bandwidth, and preferred direction for light outcoupling, between top and bottom diffracted orders.

In an embodiment said predetermined wavelength $\lambda$ is comprised between 380 nm and 1200 nm and in that said predetermined spectral width $\Delta\lambda$, defined as being the full width half maximum of the optical spectrum of said outcoupled fraction 10c, is less than 100 nm, preferably less than 80 nm, more preferably 50 nm. Using incident light beams 10a emitted by said light emitter 110 and having a very narrow spectral width $\Delta\lambda$ can provoke speckle effect and can therefore impact negatively the combining of this light beam 10a with see-through light. For this reason, said predetermined spectral width $\Delta\lambda$ is preferably larger than 0.1 nm, more preferably larger than 0.5 nm and can be larger than 1 nm or larger than 3 nm using a spectrally broad-enough light source in said light-emitter 110. The wavelength $\lambda$ of said incoupled mode 10b can be predetermined with the orientation and spatial periodicity of said first grating 22, in conjunction to said permittivity cross-section of said waveguiding layer 20. Additionally, the spectral width $\Delta\lambda$ of the incoupled mode 10b can be engineered by modifying the leakiness of said first RWG 23, especially by tuning the diffraction efficiency of said first grating 22, which can be realized by choosing its depth and profile. Modifying the wavelength $\lambda$ and the spectral width $\Delta\lambda$ of said incoupled mode 10b will directly modify said wavelength $\lambda$ and said spectral width $\Delta\lambda$ of the outcoupled beam 10c. Additionally, the geometry of said second grating 24 can modify said wavelength $\lambda$ and said spectral width $\Delta\lambda$ of the outcoupled beam 10c.

In an embodiment the waveguiding layer 20 comprises a high refractive index material. High refractive index (HRI) materials are especially well guide to guide light while exhibiting good optical transparency. Such HRI materials are especially HRI dielectrics and HRI semiconductors. The qualification of dielectric or semiconductor for a HRI material may depend of the wavelength range of interest, of the material usage and the material thickness. As an example, silicon (Si) can considered as a semiconductor or dielectric in the visible or NIR ranges, depending of its doping and of the silicon layer thickness. High refractive index material may be chosen from the materials $TiO_2$, $ZnS$, $Si$, $Ta_2O_5$, $HfO_2$, $ZrO_2$, $AlN$, $Al_2O_3$.

Figure 6:
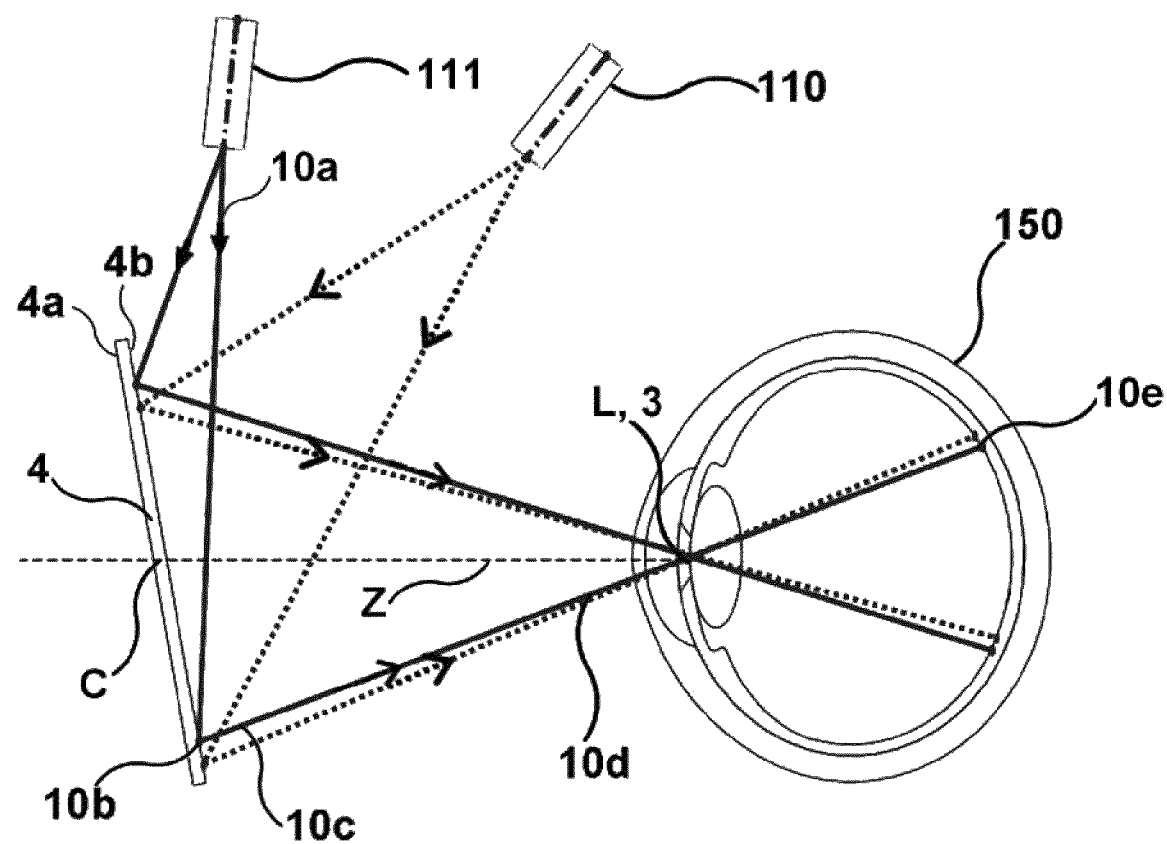
FIG. 6 shows an optical combiner directing light provided by a light emitter to the eye of an observer, configured in reflection.

In an embodiment illustrated in FIG. 1 and FIG. 6, the optical combiner 1 defines an exit pupil 3 to the side of said back side 1b at a predetermined distance from said optical combiner 1 and at a location L. As illustrated in FIG. 6 said optical combiner 1 defines a geometrical center C. Said location L is separated from said center C by a distance d. Said location L and said center C define an optical axis Z of the optical combiner 1. In such an embodiment the optical combiner 1 is adapted so that at least an outcoupled portion 10d of said at least one outcoupled fraction 10c is propagating to and incident at the location of said exit pupil 3. This preferred embodiment is especially useful in applications related to near-eye display apparatus. When used in a near eye display apparatus 100 the eye pupil is located, when looking in the direction of said axis Z, in the exit pupil of said combiner 1. The eye line of sight can be substantially aligned said optical axis Z.

In an embodiment illustrated in e.g. FIG. 1 said array 2 is arranged so that when the pupil of an eye 150 of an observer is located at said exit pupil 3, at least a part 10e of said outcoupled portion 10d is entering the cornea and the eye pupil and is incident on the retina of the eye 150 of an observer.

In an embodiment illustrated in FIG. 6 said array 2 is arranged to redirect, onto said exit pupil 3, a portion of a plurality of incident light beams provided by at least two light emitters 110, 111 emitting each a lightbeam projecting an image, or imaging beam, each lightbeam of the array impeding on various locations of the optical combiner 1 and some of these lightbeams form incident lightbeams 10a incident on a first resonant waveguide grating 23 of said array 2. A fraction 10c of these incident lightbeams 10a are outcoupled after being guided in said waveguided layer. It is understood that said plurality of imaging light beams may be provided by a single light source or by several light sources.

In an embodiment, illustrated also in FIG. 6, the optical combiner 1 is arranged so that at least an outcoupled fraction 10c is propagating away from a specular reflected fraction of said incident light beam 10a on said waveguiding layer 20 and away from the transmitted fraction of said incident light beam 10a that is transmitted through the waveguiding layer 20. This preferred configuration distinguishes the geometry used from a free-form optics reflective combiner used in NED apparatus. This is especially made possible because said gratings 22 and 24 have different grating vectors. As illustrated in FIG. 6, the orientation of the outcoupled light beams 10c can be any orientation relative to said axis Z. This enables providing optical combiners in any shape and orientation in respect to said axis Z. In this example, the combiner 1 has flat shape and is slightly tilted compared to the eye line of sight Z, the field of view (FOV) being however symmetric relative to the line of sight. FIG. 6 illustrates a cross-section viewed from either the top or from the side of the head of an observer, both configurations to place light emitters 110 being possible.

In an embodiment, illustrated in FIG. 6, the optical combiner 1 is arranged so that at least a fraction of said incident beam 10a is incident on said back side 4b of said substrate 4 before impeding said first RWG 23. As illustrated in FIG. 6, various light emitters 110,111 can be used to illuminate a single optical combiner 1, the optical combiner 1 being designed to redirect light from various emitters towards an exit pupil where the pupil of an eye of an observer is represented.

Figure 7:
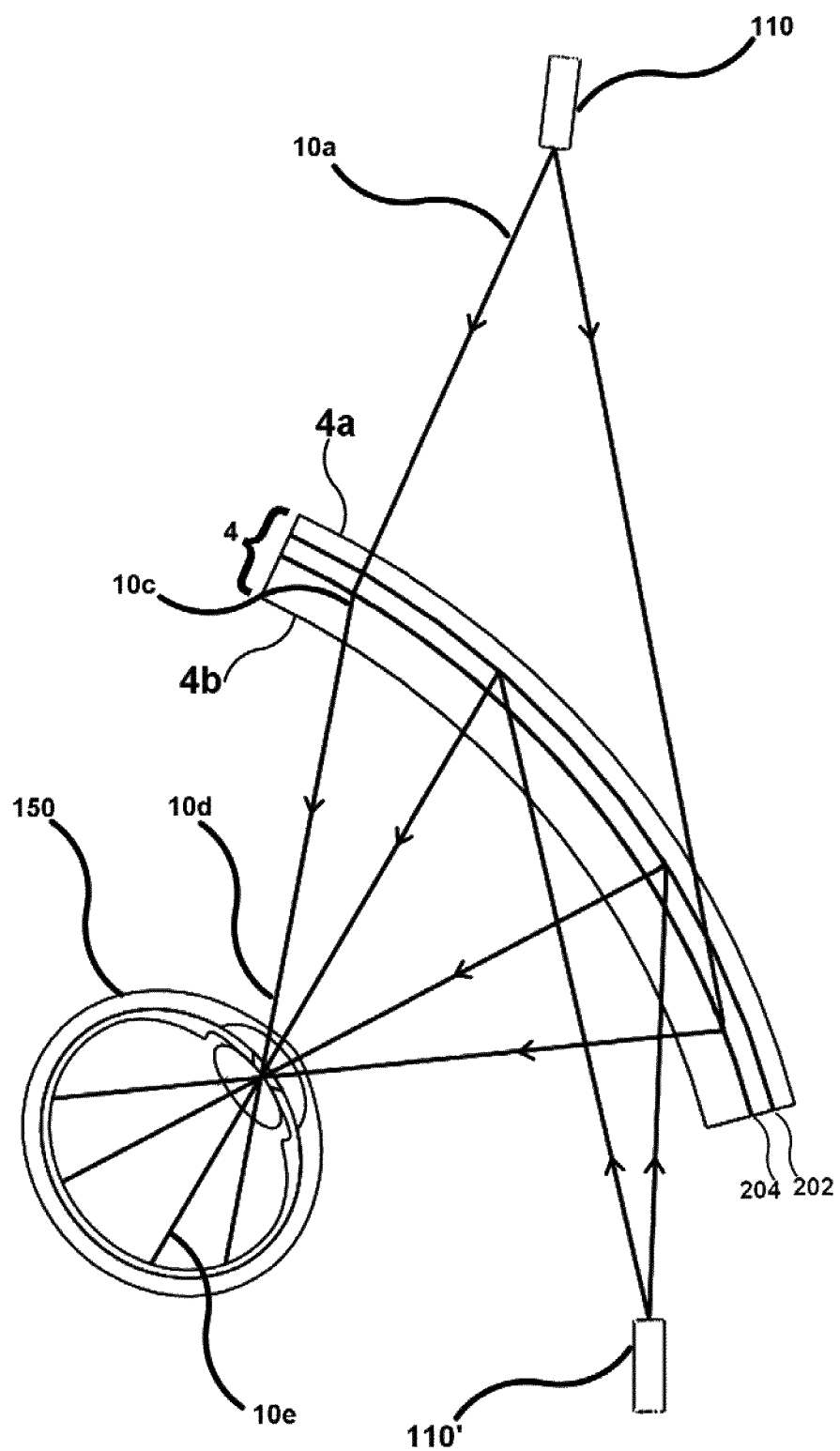
FIG. 7 an optical combiner directing light provided by a light emitter to the eye of an observer, configured to be used both in in transmission and reflection and comprising a plurality of waveguiding layers.

In an embodiment, illustrated in FIG. 7, the optical combiner 1 is arranged so that at least a portion of the emitted light beam 10 is incident on said first surface 4a of said substrate before a portion 10b of said beam 10a impeding on said first RWG is resonantly incoupled in said waveguiding layer 20. A portion 10c of said guided beam 10b is outcoupled towards the second surface 4b of said substrate and directed to an exit pupil 3 where an eye of an observer 150 is represented for illustration. In this configuration, a portion of said impeding light beam 10a is incoupled, guided and outcoupled, 10c, towards a different direction located on the opposite side of said light emitter 110, in a transmissive beam redirection.

As illustrated in FIG. 7, an optical combiner combiner 1 may comprise various waveguiding layer 202, 204 comprising arrays 2 of RWG designed to operate only in reflective beam redirection as illustrated on said waveguiding layer 202. A combiner 1 can as well operate in both transmissive and reflective beam redirection as illustrated on said waveguiding layer 204, said incident beams being provided by at least two light emitters 110 and 110' situated respectively to opposite sites o said optcail combiner 1. An array 2 of RWG on a waveguiding layer 20 can be designed to operate only in transmissive beam redirection.

Figure 8A:
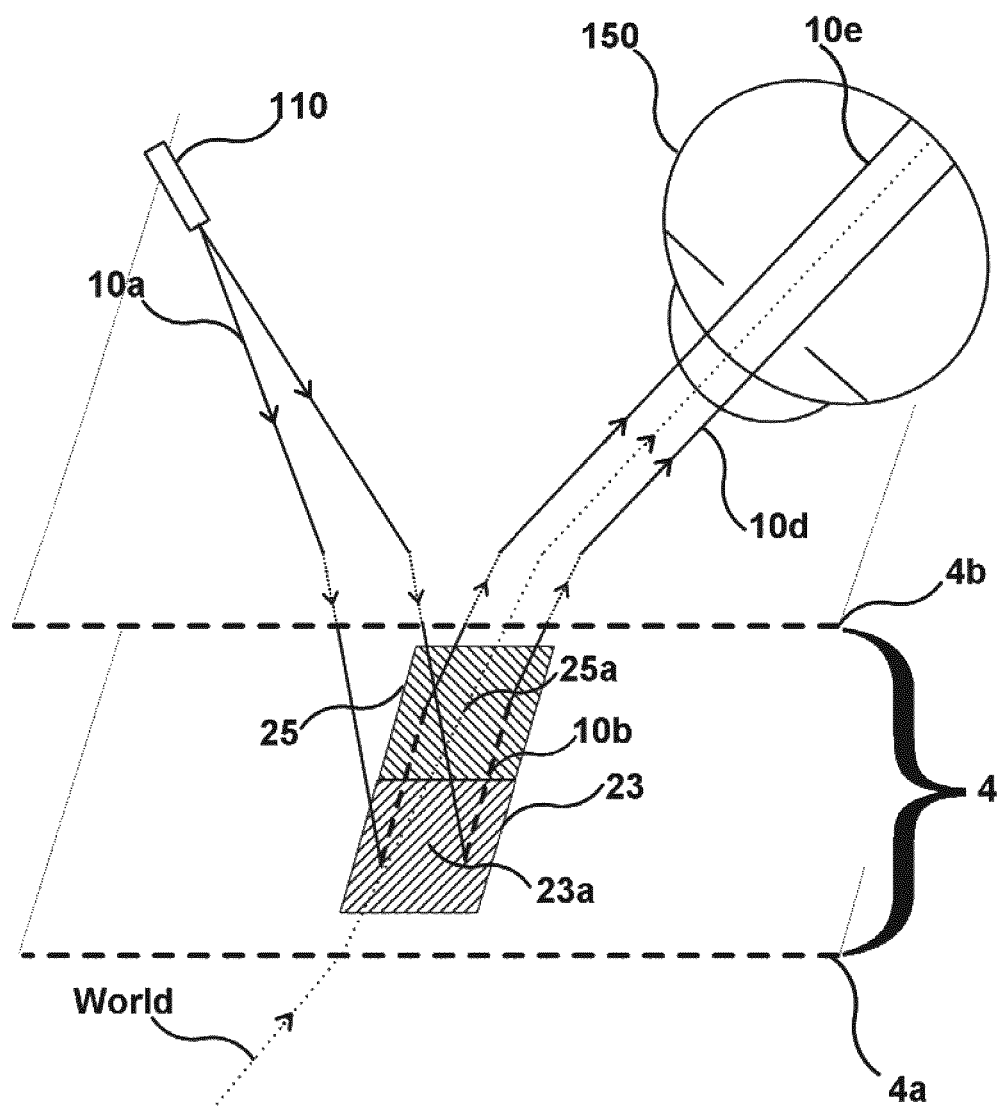
FIG. 8a illustrates the redirection of an incident optical beam travelling in free-space by a pair of resonating waveguide gratings.

In an embodiment the optical combiner 1 is adapted to receive incident light provided by a light emitter 110, said incident light travelling in free-space before impeding on the waveguiding layer 20. The light path of such light redirection by the an optical combiner 1 is illustrated in FIG. 8a. FIG. 8a illustrates a reflective beam redirection with said incident light beam entering said substrate from said second surface 4b. Said incident light beam 10a from said emitter 110 is refracted at said back surface 4b. At least a portion is resonantly incoupled in said first RWG 23 and is guided in said waveguiding layer 20 to said second RWG 25. A portion 10c of said incoupled portion 10b is outcoupled, and refracted when exiting said substrate 4 at said back surface 4b and propagates 10d toward the exit pupil 3. The eye 150 of an observer is illustrated in FIG. 8a in the configuration wherein said portion 10e enters said eye pupil 3 and propagates to the retina of said eye 150. Said first 23 and second 25 RWG may be located inside said substrate 4, in between said first and said second surfaces 4a, 4b.

The FIG. 8a illustrates a reflective beam redirection with said incident light beam entering said substrate 4 from said second surface 4b. A transmissive configuration is illustrated in FIG. 7. In a transmissive configuration with light incident on said substrate 4 from air from said first surface 4a, refraction at said first surface 4a and second surface 4b would occur as for the reflective configuration illustrated in FIG. 8a.

Figure 8B:
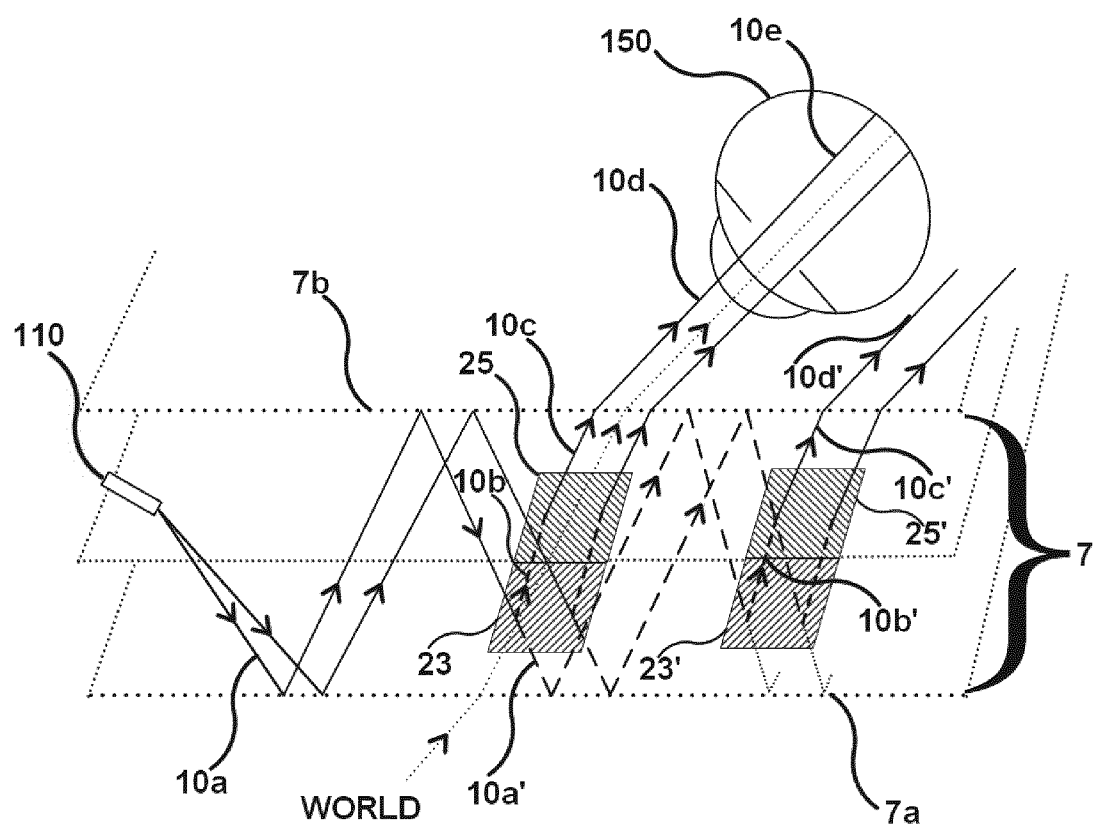
FIG. 8b illustrates the redirection of an incident optical beam impeding from a lightguide by two pairs of resonating waveguide gratings, arranged to expand the exit pupil of an optical combiner.

In an embodiment the optical combiner 1 is adapted to receive incident light provided by a light emitter 110, said incident light being guided by a lightguiding optical element 7 arranged in the light path between said light emitter 110 and said array 2. FIG. 8b illustrates a configuration in which the combiner 1 is used with a lightguiding optical element 7, said lightguiding optical element 7 being used to increase the size of the exit pupil 3, in a EPE configuration. Said lightguiding optical element 7 is guiding light in between its first surface 7a and second surface 7b by Total Internal Reflection (TIR).

On the opposite to said waveguiding layer 20, said lightguiding optical element 7 is a highly multimode lightguide, light propagation in it being defined by geometrical optics, said lightguiding optical element 7 being optically thick. Optically thick is defined as having an e average thickness of said lightguiding optical element 7 defined perpendicular to the propagation direction of the lightguided light greater than the temporal coherence of light emitted by said light emitter 110. As such, interference phenomena in said lightguiding optical element 7 are excluded. This is opposite to said waveguiding layer 20 which is optically thin, meaning that the temporal coherence domain of light emitted by said light emitter 110 is smaller than said waveguiding layer 20 thickness as defined above. Said lightguiding optical element 7 is operating in the geometrical optics domain while said waveguiding layer 20 is operating in said wave-optics domain, the term lightguide and lightguiding and waveguide and waveguiding being used for each respectively. Said lightguiding optical element 7 allows to redirect, by TIR, the part 10a' of the incident light beam 10a that is not incoupled into said first RWG 23, toward a second pair of RWG 23', 25', said first RWG of said second pair 23' incoupling resonantly a second portion 10b' guided in the waveguiding layer 20, of which a fraction 10c' is outcoupled and propagates, parallel to the outcoupled portion 10c of said first RWG 23. The two portions 10c and 10c' are propagating parallel but spatially separated which allows achieving an expansion of the exit pupil 3. Said substrate 4 can be laminated onto or embedded into said lightguiding optical element 7. Using a sufficiently thick transparent substrate and propagating incident light into to, said substrate 4 can become the lightguiding optical element 7.

Said EPE strategies when using DOE are explained for example in US2013250431 and US2015309263. EPE can be two dimensional. However, the see-through combiner 1 can produce an EPE in one dimension, the EPE on the other axis/dimension being made by a separate optical element, possibly non see-through, located in the optical path before said lightguiding optical element 7.

In an embodiment the transparency of the optical combiner 1, defined perpendicular to said waveguiding layer 20, in said visible wavelength range is higher than 50%, preferably higher than 70%, more preferably higher than 80% and even more preferably higher than 90% for light provided by a light source facing said front side 1a. Using very low mode and preferably monomode waveguiding layer 20 and very short period gratings, able to diffract light only into resonant incoupling into said waveguiding layer, as described above, the pairs 2 or RWG can be designed to be highly spectrally and angularly selective, allowing very low parasitic diffraction and haze and very high transparency.

Figure 9:
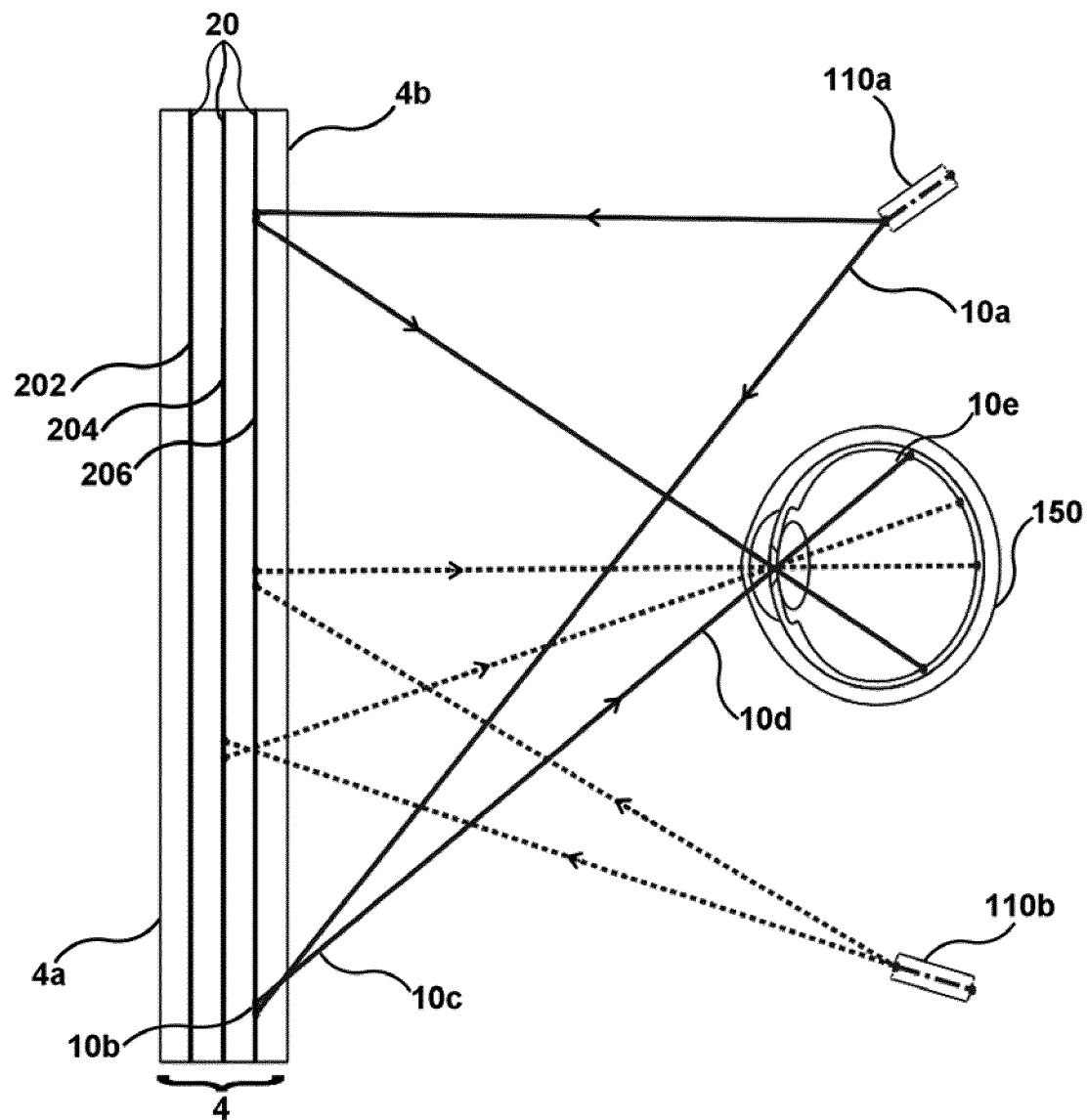
FIG. 9 illustrates an optical combiner comprising different subsets of resonating waveguide grating pairs, located in in multiple waveguiding layers.

FIG. 9 illustrates an optical combiner 1 comprising at least three waveguiding layer 202, 204 and 206. Superposing three waveguiding layers allows providing more pairs 23, 25 of RWG. The plurality of pairs 23, 25 can be organized in subsets of pairs located in a common or in different waveguiding layers. As illustrated in FIG. 9, a set of pairs of RWG 23, 25 located in said waveguiding layer 206 redirect light provided by said light emitter 110a towards an exit pupil 3 where the eye 150 of an observer is represented. Another subset 2b is redirecting light incident from said light emitter 110b and is located in both waveguiding layer 204 and 206. Specific subset of pairs of RWG can be used to perform specific optical functions of the combiners and do not need to be located in a single waveguiding layer. As an example, three waveguiding layer 202, 204 and 206 can be superposed in a combiner, each waveguiding layer comprising a subset 2a, 2b and 2c of pairs of RWG configured to provide each an outcoupled fraction 10c of light having a different central wavelength, for example RGB central wavelengths. Such a configuration may for example provide a higher X,Y, defined as lateral, resolution for each color by using a full waveguiding layer useful surface. Said X any Y directions are defined perpendicular to said Z-axis.

In other examples discussed below, different virtual image planes at different virtual distance from the observer can be provided. These different spectral ranges are especially selected to provide a wide color gamut, such as containing at least one in the violet/blue color range, one in the green color range and one in the red color range.

In an embodiment, the optical combiner 1 comprises at least three different subsets of pairs 2 that are configured to provide each an outcoupled fraction 10c having different spectral widths.

In an embodiment said subsets may be located in a single waveguiding layer 20.

In an embodiment at least one of the subsets is located in a second waveguiding layer arranged on said substrate layer 4.

In an embodiment, illustrated in FIG. 9, said combiner 1 comprises at least a first 202, a second 204 and a third 206 waveguiding layer. The first waveguiding layer 202 comprises a first array 202a configured to provide an outcoupled fraction 10c of red light, the second waveguiding layer 204 comprises a second array 204a configured to provide an outcoupled fraction 10c of green light and said third waveguiding comprises a third array 206a configured to provide an outcoupled fraction 10c of blue light.

Figure 10A:
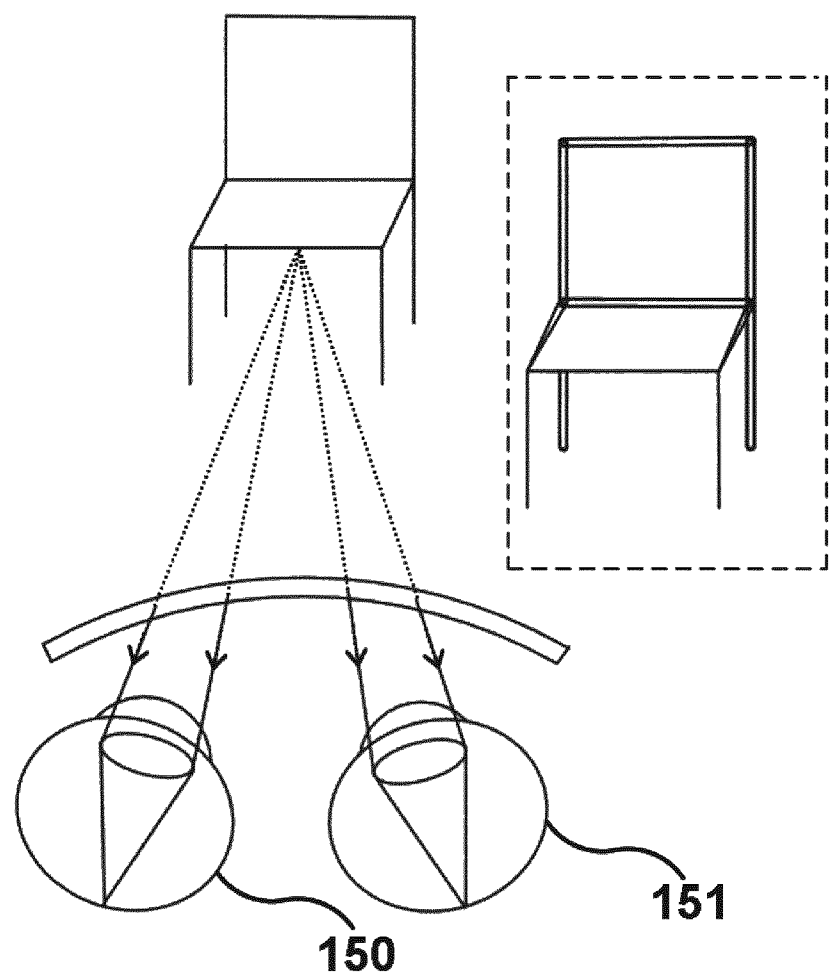
FIGS. 10a and 10b illustrate the projection of virtual images by an optical combiner.
Figure 10B:
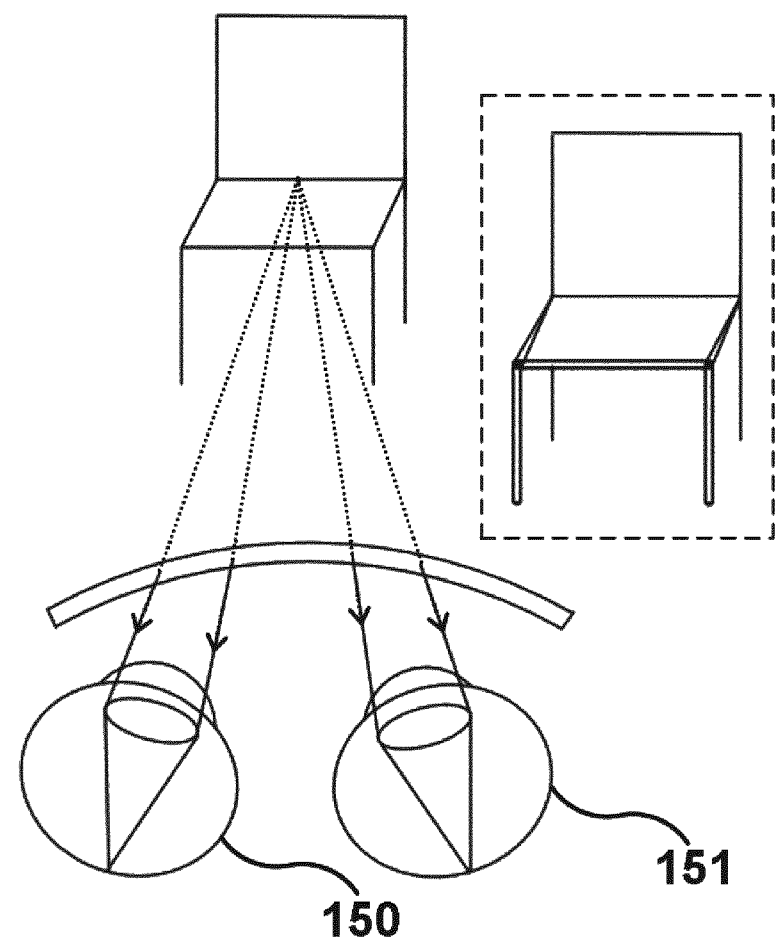

FIG. 10a and FIG. 10b illustrates a NED configured in light-field display. The two eyes 150, 151 of an observer can observe virtual images located at a certain distance of said observer. In the illustration of FIG. 10a and FIG. 10b, the image of a chair is provided. In a light-field display configuration, the perceived virtual image is not 2 dimensionnal but three dimensionnal. Depending on their vergence, said two eyes 150, 151 will accommodate at different focal distances because of the vergence accomodation reflex and will perceive different images. In this illustration of a light-field NED, parts of objects out of focus of the eye accomodation and vergence distance are observed as blurred by the observer, as the back of the chair in FIG. 10a and the front of the chair in FIG. 10b. On the opposite, parts of virtual objects located at the eye accomodation and vergence distance are perceives in focus, as the front of the chair in FIG. 10a and the back of the chair in FIG. 10b. Such light-field display configurations or multi-focal plane displays configurations can be realized by numerous methods as illustrated in the scientific litterature targetting at simulating light cones coming from a pixel at a given finite distance from a user.

In an embodiment the optical combiner 1 is configured to project virtual images, provided by said light emitter 110 onto said exit pupil 3, said images containing, in a light-field display configuration, pixels located in different image planes at different focal distances from said optical combiner.

In an embodiment said array 2 comprises at least two subsets of grating pair arrays 2, each subset being configured to direct to said exit pupil light beams provided by said light emitter 110 configured to provide at least two images at two different focal distances from said optical combiner.

Figure 11A:
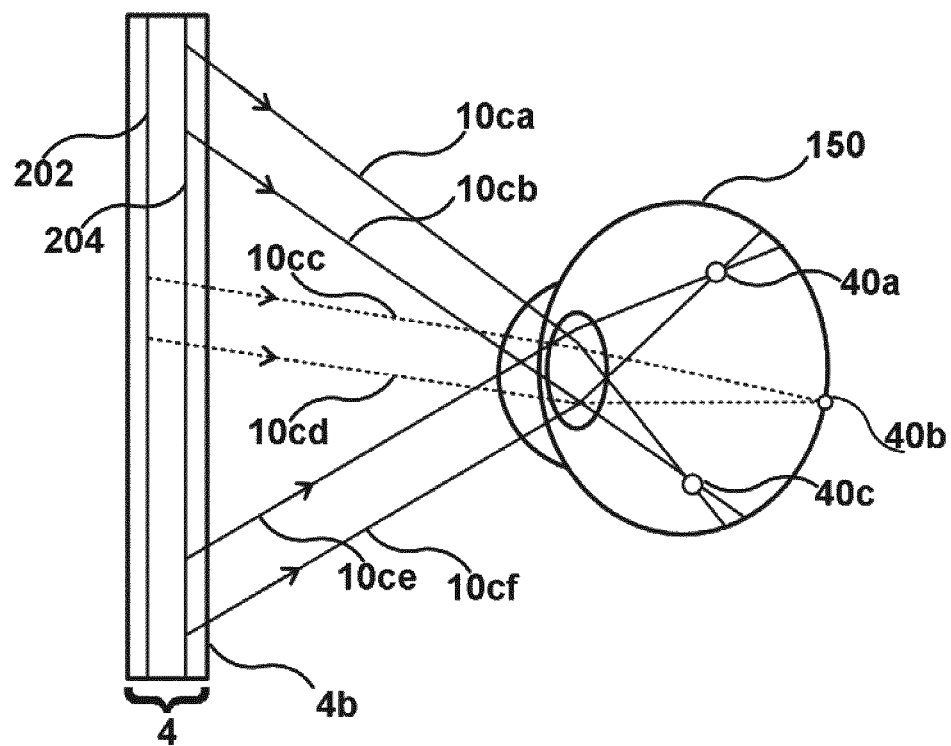
FIGS. 11a and 11b illustrate the projection of two images located at different distances relative to an optical combiner with different eye accommodation.
Figure 11B:
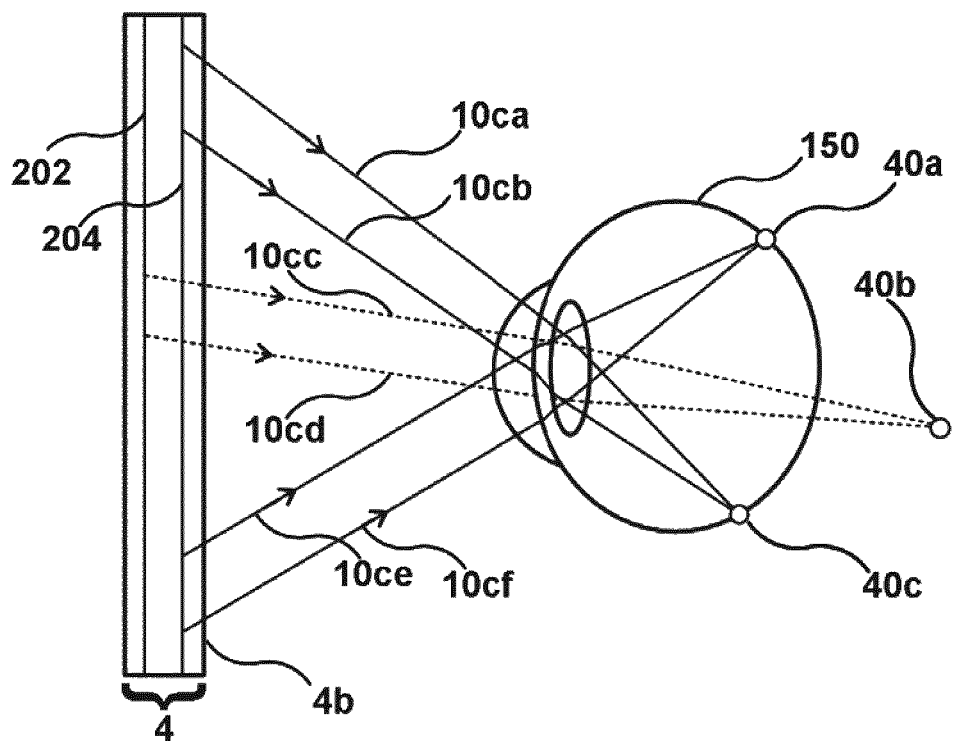
Figure 12:
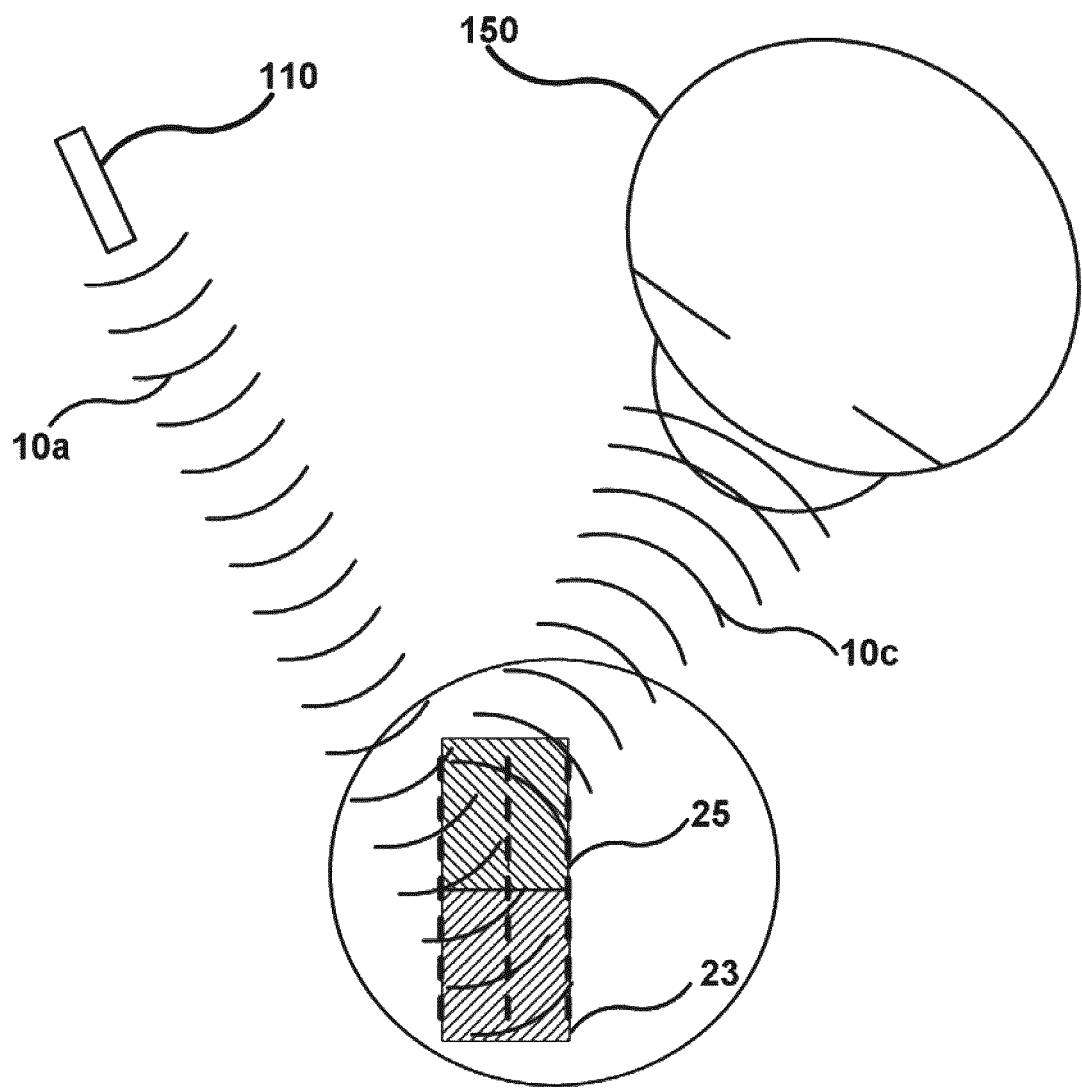
FIG. 12 illustrates an optical combiner configured to provide an outcoupled light beam having a non-planar wavefront.
Figure 16:
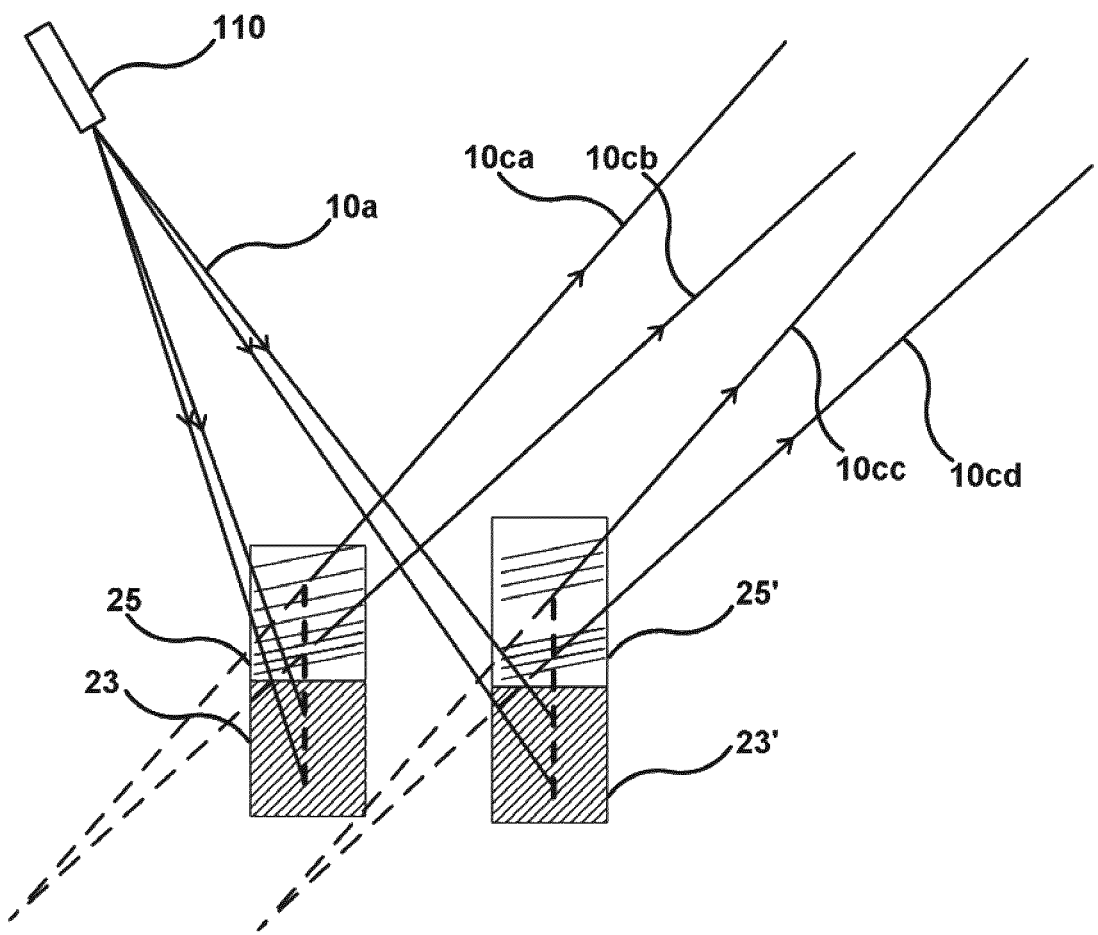
FIG. 16 illustrates two resonating waveguide grating pairs of an optical combiner comprising gradient periodicity gratings and non-continuous gratings

In an embodiment illustrated in FIG. 11a and FIG. 11b the optical combiner 1 is configured to have two subset, each subset being located on respectively said waveguiding layers 202 and 204 of said array 2, each of said subset of the array 2 couples out of said waveguiding layers 202 and 204 outcoupled beams 10c comprising beamlets respectively 10ca, 10cb, 10ce, 10cf and 10cc, 10cd. The two beamlets of the pairs of said beamlets 10ca and 10cb, beamlets 10cc and 10cd, beamlets 10ce and 10cf are either parallel in respect to each other or non-parallel and emitted from common points located at finite distance from the observer. Each beamlet is defined as a narrow beam having a cross-section smaller than 0.5 mm, preferably smaller than 0.2 mm, more preferably smaller than 0.1 mm, said cross section being defined at any location of the light beam between said second grating 24 and said virtual exit pupil 3, the eye accommodation cannot distinguish accurately the collimation of each beamlet but perceives a sharper image when accommodating on the virtual image plane from which pairs of beamlets are diverging, as illustrated by the convergence points 40a, 40b and 40c of the three pairs of beamlets for different eye accommodation. FIG. 11a and FIG. 11b illustrates the creation of pixels of images located at two different finite distances from the user using for each pixel two beamlets. The pairs of beamlets can be provided by pairs 23, 25 of RWG outcoupling more than a single outcoupled beam 10c as illustrated in FIG. 16 or various pairs 23, 25 of RWG may be used to create pairs of outcouple beamlets. In FIG. 11a and FIG. 11b the light emitter 110 is not shown.

This light emitter may be positioned to either side of the optical combiner 1. It is understood that in the embodiment of FIGS. 11a and 11b several light emitters may be used to achieve the described effect.

In a similar way, subsets of said array 2 of RWG can be configured to provide pixels using more than two beamlets and to provide virtual images from a plurality of image planes located at different distances from said exit pupil 3.

In an embodiment, illustrated in FIG. 11, the optical combiner 1 is configured so that said beamlets have each a parallel collimation and a cross-section so that when an eye of an observer is located at said virtual exit pupil (3) the focal plane of the virtual source of said beamlets cannot be resolved. This can be provided by selecting pairs 23, 25 of RWG of the appropriate dimension, preferably of small dimension and providing outcoupled beams 10c having a parallel or quasi-parallel collimation. Such configuration may prevent VAC (define) as images may be sharp at the vergence distance of an observer but may provide an uncomfortable accommodation reflex, the eye being unable to detect an accommodation providing a sharper focus. Such configuration is usually named retinal projector or virtual retinal display configuration.

In an embodiment at least a subset of RWG pairs of said array 2 is configured to redirect in reflective or transmissive configuration outcoupled light beams 10c having non-planar wavefronts and provided by at least one light emitter 110 apparatus. A light emitter can be configured with varifocal or multifocal elements to provide light beam 10a and imaging beam having a curved wavefront simulating line cones emitted at a finite distance. The pairs 23, 25 of RWG can be configured to redirect such wavefront towards 10c an exit pupil 3 without modifying their curvature as illustrated in cross-section in FIG. 12. In FIGS. 12 to 15, the wavefront curvatures are illustrated in cross-section locally near the pair 23, 25 for clarity. Ideally spherical wavefronts have a 2D curvature whose curvature radius increase with the distance from the virtual object and whose curvature is modified when changing media, for example entering or exiting said substrate. FIGS. 12 to 15 are therefore a local illustration I of a RWG geometry designed to maintain or modify the wavefront curvature of incident light beams 10a when redirected 10c towards an exit pupil 3.

The waveguiding layer 20 is guiding the incoupled beam 10b, the light propagation speed in the waveguiding layer being necessarily different from the propagation in the surrounding substrate 4 or lightguiding optical element 7. Usually the propagation speed in said waveguiding layer 20 is lower than the propagation speed in its surroundings.

Figure 13:
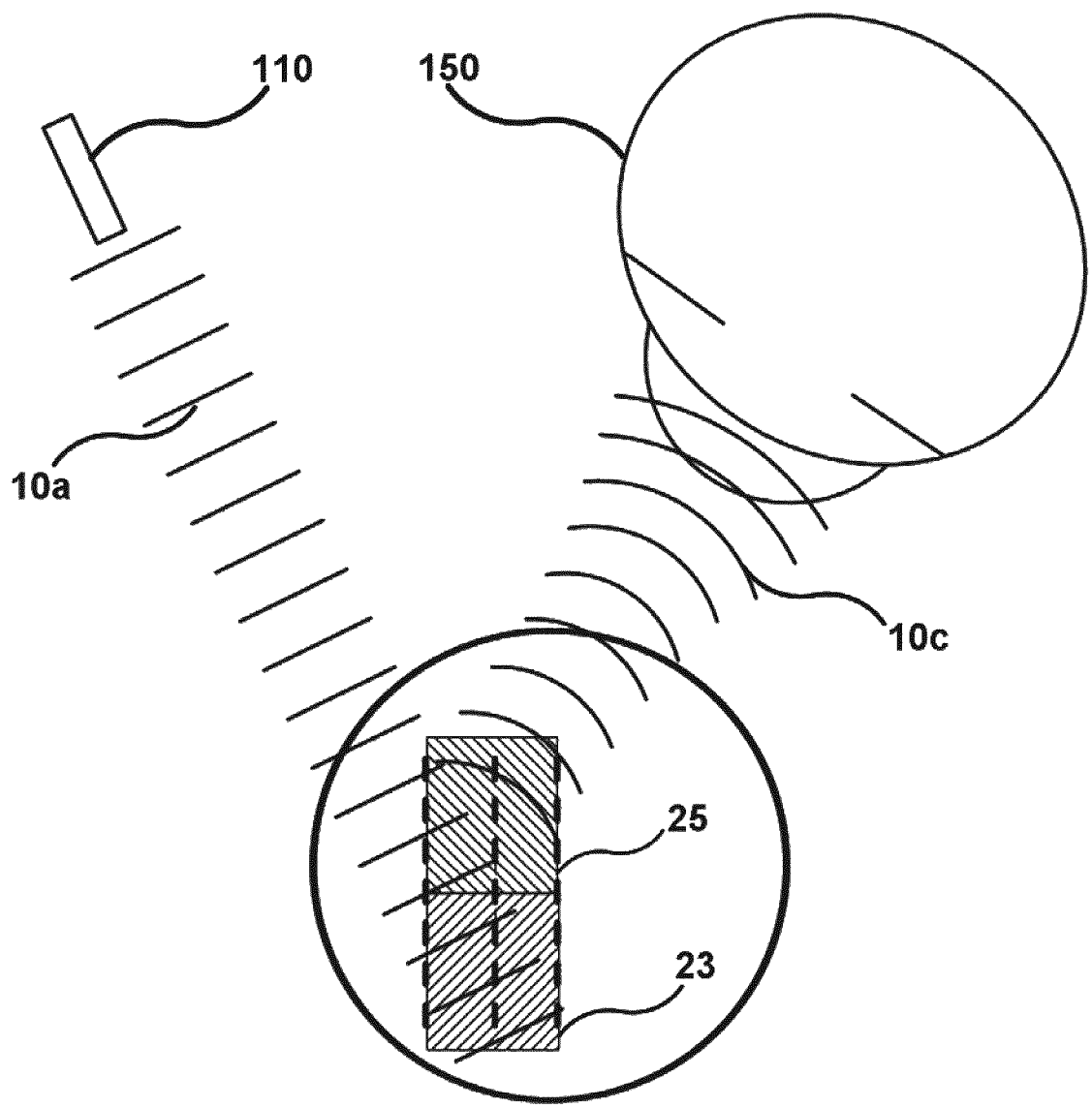
FIG. 13 illustrates a resonating waveguide grating pair of an optical combiner configured to provide an outcoupled light beam having a different wavefront curvature than the curvature of the wavefront of an incident optical beam on a resonating waveguide grating pair.
Figure 14:
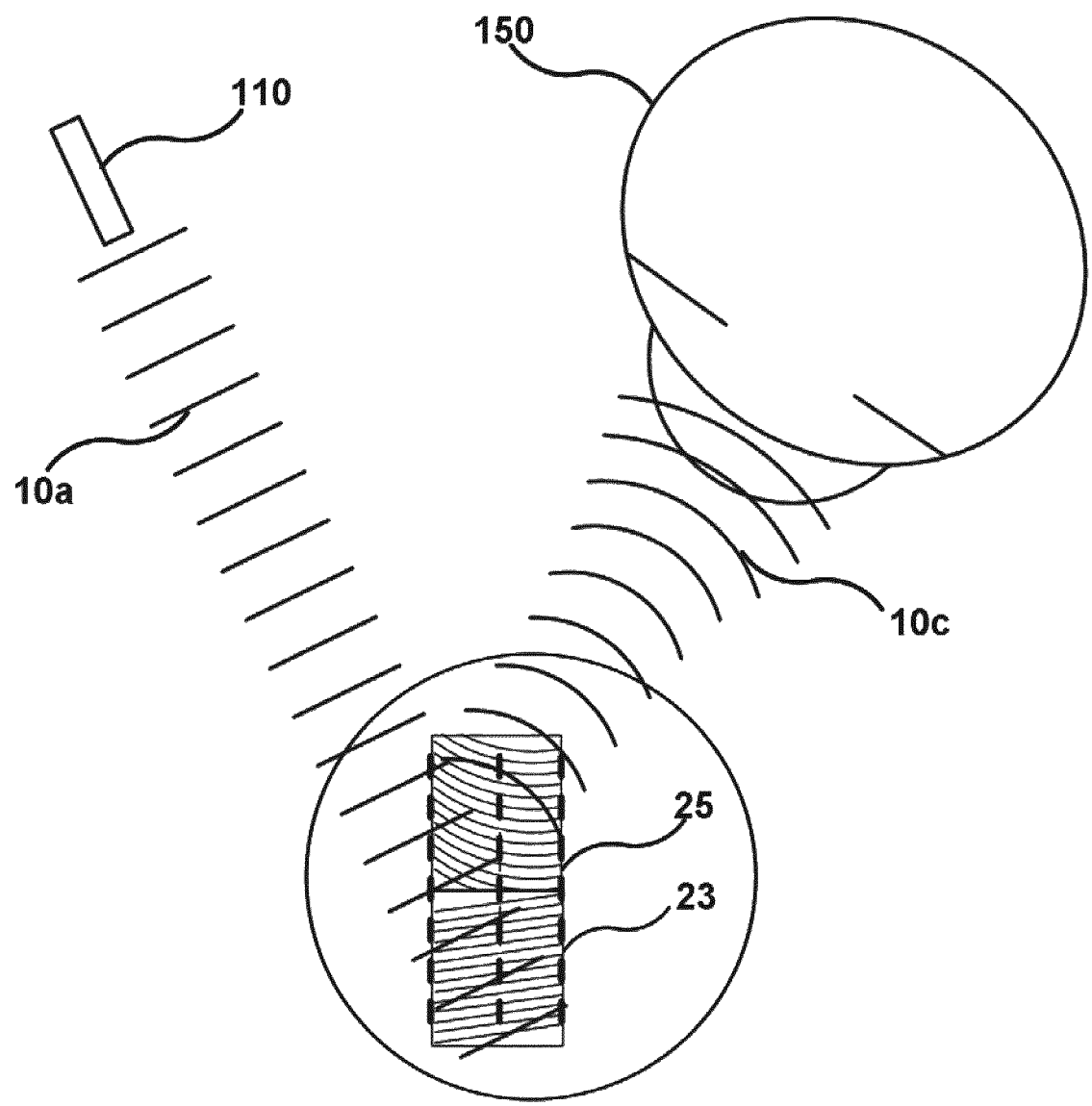
FIG. 14 illustrates a resonating waveguide grating pair of an optical combiner comprising a non-linear grating.
Figure 15:
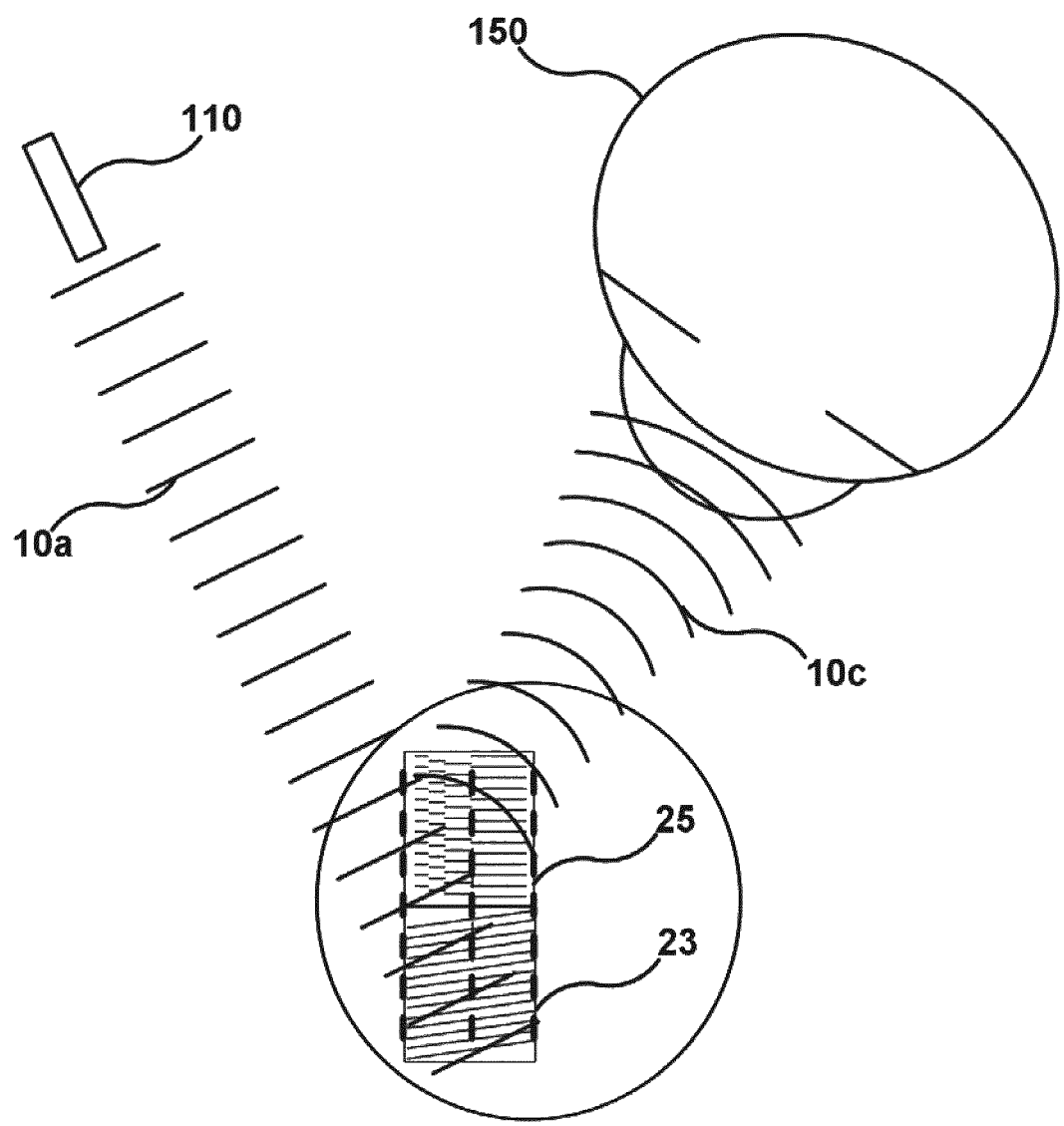
FIG. 15 illustrates a resonating waveguide grating pair of an optical combiner comprising segmented gratings.

FIG. 13 illustrates a pair of RWG 23,25 modifying the curvature of the wavefront of said outcoupled light beam 10c in respect to said incident light beam 10a. FIG. 14 illustrates using a non-linear grating to achieve it. Especially using a grating following a conical curve for said first of second grating 22, 24, the curvature radius of the wavefront of said outcoupled light beam 10c compared to the curvature radius of the wavefront of said incident light beam 10a. In particular it can be modified across the direction normal to said waveguiding layer 20 and to said guided propagation axis W as illustrated in FIGS. 13, 14 and 15. Such curvature radius of the outcoupled light beam 10c across the direction normal to said waveguiding layer 20 and to said guided propagation axis W can as well be modified using approximations of non-linear gratings and in particular approximations of conical curves as illustrated in FIG. 15 with the shape of said second RWG 25. A grating such as illustrated in FIG. 15 is defined as a segmented grating and is intended to simplify the grating fabrication process by approximating a non-linear curve with less complex geometries.

Using a gradient spatial periodicity for said first or second RWG 23, 25, the curvature radius of the outcoupled light beam 10c can be modified across the direction of the guided light 10b propagation axis W, as illustrated in FIG. 16 with a range of outcoupled light beam 10ca and 10cb. Similarly, a second RWG 25' as illustrated in FIG. 16 made of multiple grating zone of varying periods, can provide multiple outcoupled light beam 10cc, 10cd simulating light beams emitted from a point source located at a finite distance, which means a wavefront with a modified curvature radius as defined across said guided light propagation axis W. Such second grating 24 is called non-continuous grating.

The grating shapes illustrated in the FIGS. 14 to 16 on the second RWG 25 can be configured as well on the first RWG 23 or on both first and second RWG 23,25 in order to obtain the desired change of curvature radius of said outcoupled light beam 10c compared to the one of saif incident light beam 10a Combining non-linear and gradient periodicity grating for said first or said second RWG enable modifying the curvature radius in two dimensions of a redirected light beam 10c so as to mimic accurately to the eye of an observer a light cone emitted by a pixel located at a finite distance from said eye of an observer.

In a variant, subsets of said array 2 can be configured so that at least one of said outcoupled fractions 10c has a different wavefront than the wavefront of said incident light beam 10a.

Figure 17:
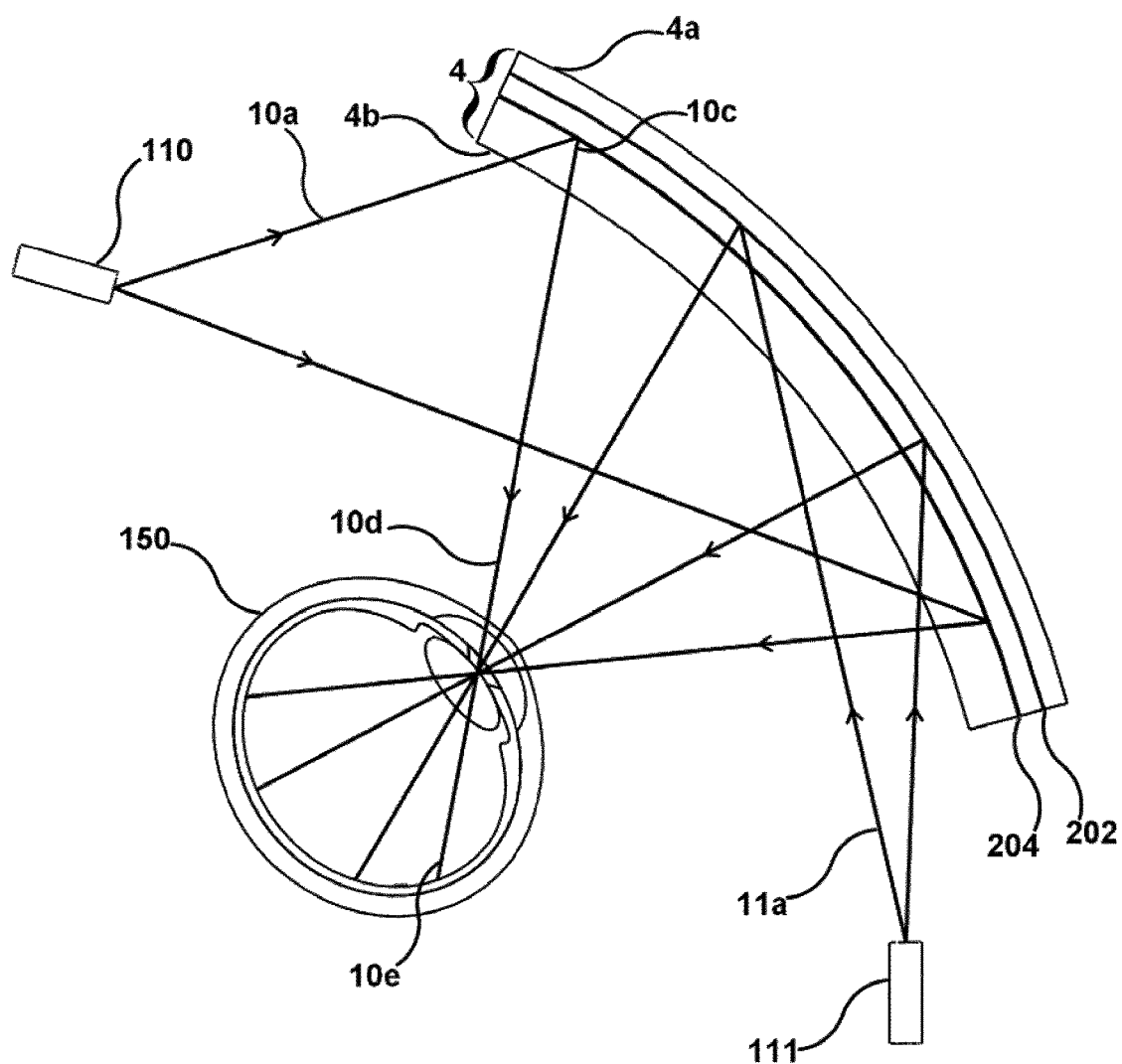
FIG. 17 illustrates an optical combiner having a complex 3D-curved shape.

FIG. 17 illustrates an optical combiner 1 comprising at least two said waveguiding layers 20 comprising at least two subsets of said array 2 of RWG configured to redirect light from at least two light emitter 110, 111.

The plurality of degrees of freedom when designing an array 2 of pairs of first and second RWG 23, 25 in term of grating profile, grating period, grating line shape, periodicity gradient for both RWG, the guided-mode propagation axis W, the waveguiding layer permittivity cross-section and the grating outer shape and arrangements in arrays allow designing said optical combiner 1 having said waveguiding layer (20) in any pre-determined complex 3D curved surface, independently from said light emitter position 110 and said virtual exit pupil 3. As an example, the combiner 1 can follow the curvature of a visual corrective lens surface.

In an embodiment, a first subset of said array 2 is located on said waveguiding layer 202 can provide to the exit pupil 3 a high XY resolution RGB image of which the depth of the focal plane cannot be resolved accurately by human eyes, as explained above, provided by said light emitter 111. And a second subset of said array 2 is located on said waveguiding layer 204 provides a lower XY resolution image to the exit pupil 3 containing predetermined focal plane depths. This second image allow the eye accommodation reflex to accommodate, at a predetermined focal distance. This predetermined focal distance can be varied by modulating the imaging beam 10 shape, polarization or spectral composition provided by said light emitter 110. As discussed above, it is of particular interest to provide large exit pupils or eye-box for near-eye-displays. The exit pupil of said combiner can be extended by various means, including static and dynamic EPE based on gaze tracking.

Figure 18:
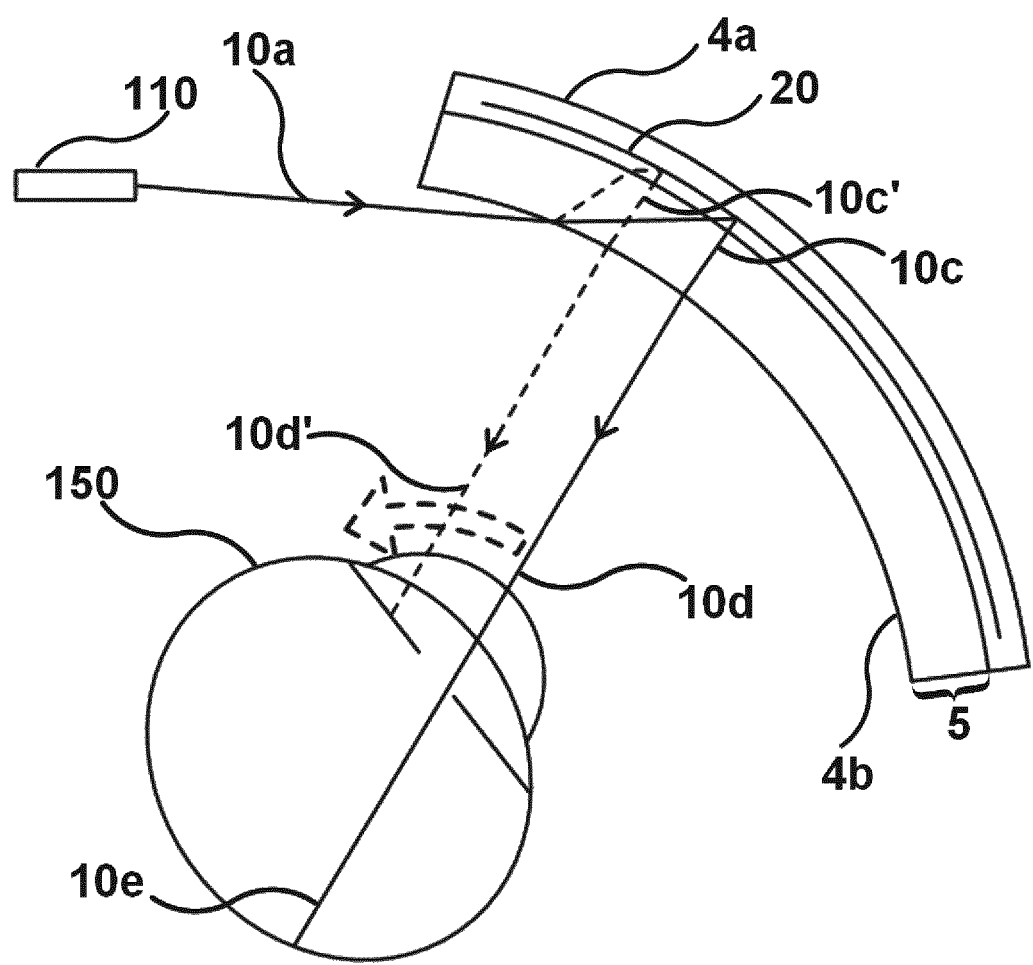
FIG. 18 illustrates an optical combiner comprising an index layer comprising means to modulate the refractive index of the layer so as to modify the exit pupil of the optical combiner.

In an embodiment illustrated in FIG. 18, the optical combiner 1 comprises an index layer 5 which comprises means to modulate its refractive index, for example a Kerr effect material, so as to enable to modify dynamically the position of the virtual exit pupil 3.

In an embodiment the optical combiner 1 comprises at least two subsets of said pair 23, 25 that are configured so that image-containing incident light beams provided from various light emitters 110 are at least partially outcoupled by said array 2 and directed on said exit pupil 3 and so that the perceived images by an observer are stitched laterally so as to increase the resolution and/or the field of view of the perceived images by an observer whose pupil is located at said exit pupil 3.

In an embodiment the optical combiner comprises 1 at least two subsets of said array 2 that are configured so that image-containing outcoupled light beams 10c, provided by a plurality of light emitters 110 and outcoupled towards said virtual exit pupil 3 appear to be provided by virtual sources located at different focal distance from said virtual exit pupil 3.

Figure 19A:
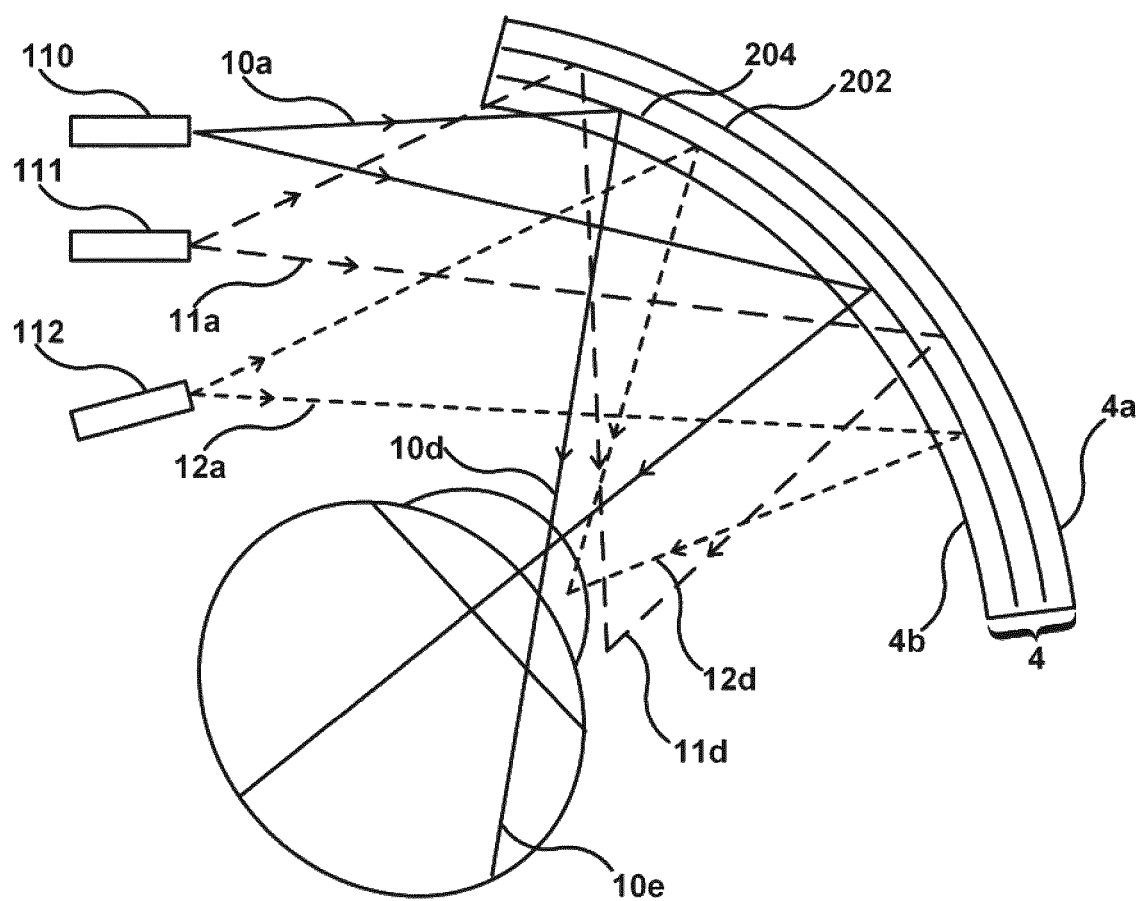
FIG. 19a and FIG. 19b illustrates various subsets of resonant waveguide grating pairs of an optical combiner located on a single or on multiple waveguiding layers, expanding the exit pupil of the optical combiner.
Figure 19B:
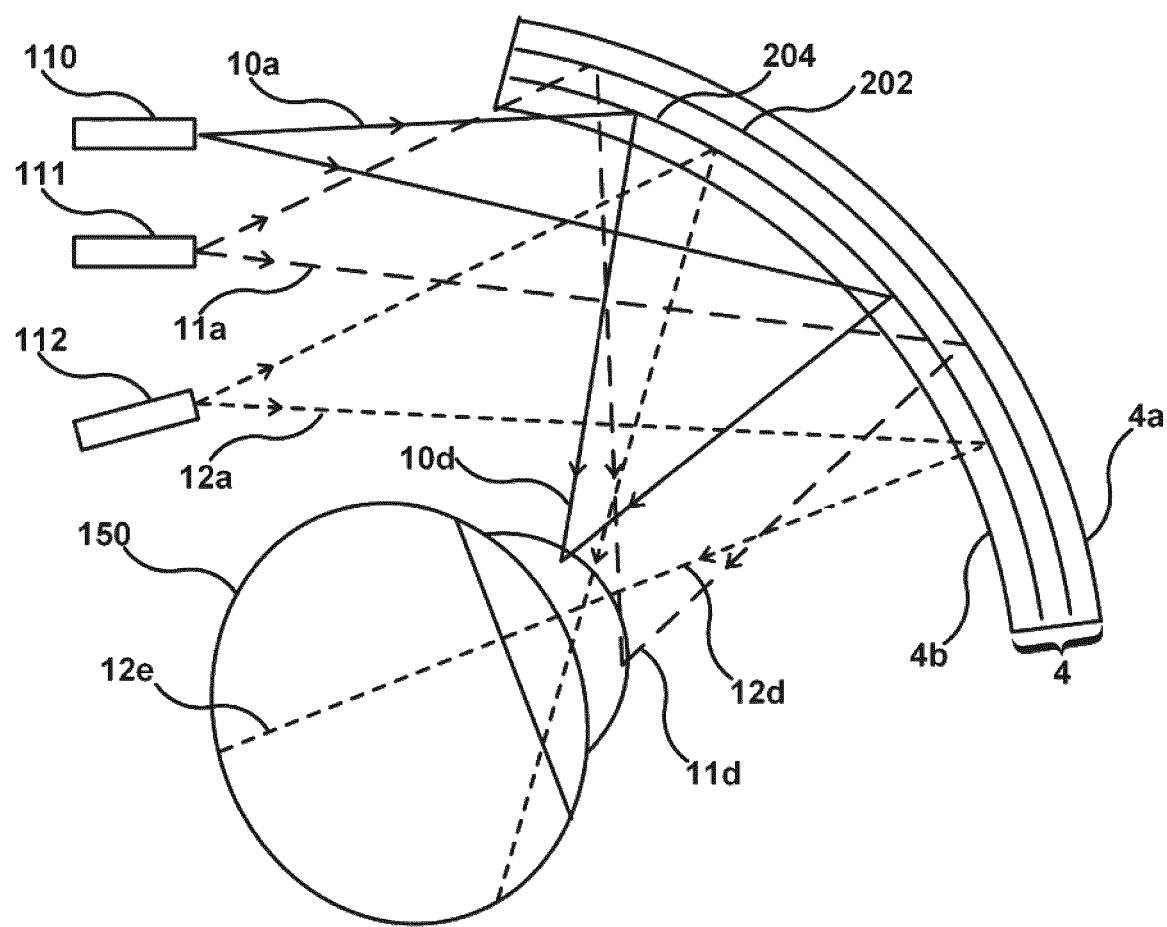

In an embodiment, illustrated in FIGS. 19a,b the optical combiner 1 comprises a plurality of waveguiding layers 202, 204, each waveguiding layer comprising at least one of said arrays 2 configured to provide outcoupled fractions 10d, 11d, 12d that are spatially separated so as to enhance the aperture of said exit pupil 3. As illustrated in FIG. 19, the different fractions 10d, 11d and 12d may be generated by different light emitters 110,111,112 that are spatially separated. Alternatively, a larger exit pupil 3 or eye-boy may be obtained by said light emitter 110 providing incident beams that are polarization or spectrally separated, an array being configured to redirect each beam to different exit pupil locations.

Figure 22:
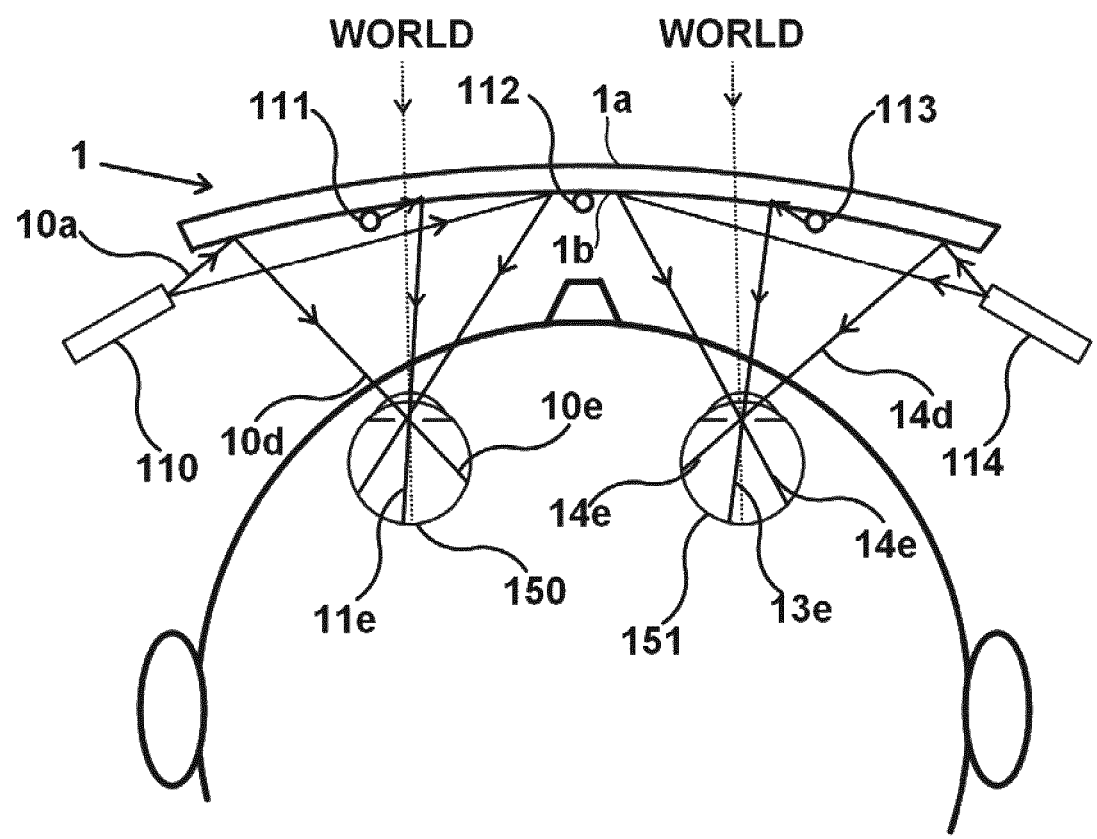
FIG. 22 shown an optical combiner comprising two different exit pupils in a configuration with light impeding from free-space.

In an embodiment said array 2 is arranged so that at least two exit pupils (3a, 3b) are defined and so that each of the two eyes 150,151 of an observer can be positioned in the location of said two exit pupils (3a, 3b), and at least a part 10e of said outcoupled portion 10d is incident on the retina of each eye of an observer. As described above, said array 2 can receive a light beam provided by an emitted beam travelling in free space as illustrated in FIG. 22. The light beam may also be provided by light guided by a lightguide as illustrated in FIG. 23 as viewed from the top of the head of an observer. Said light emitters 111-114 may be positioned anywhere on said display 100, for example on the side of said display 110,114 and/or the top or bottom side of the display. Said combiner 1 may comprise one or a plurality of waveguiding layers 20. The optical combiner 1 may comprise one or several subset(s) of said array 2 of pairs 23, 25 of RWG configured to increase the lateral resolution and/or to broaden the FOV and/or to provide various image focal plane at various distances in a light-field display configuration and/or to increase the size of the exit pupil 3.

It is generally understood that subsets of said array 2 may be arranged to have different combined functions such as for example providing an enhanced exit pupil and allow to provide a huge possible depth of focus of virtual images when used in for example a near-eye display apparatus 100. In another example at least one subset of said array 2 may be arranged to attenuate a portion of the visible spectrum, for example the blue part of the visible spectrum.

Said array 2 or subset of said array can be designed, according to the optical configurations disclosed in this document and their optical properties to additionally perform other optical function such as lensing effect other optical effect. Other optical element may be integrated om other part of the optical combiner or NED apparatus using said combiner, preferably out of the line of sight Z for the user, such as NIR light redirection, collimation optics, exit pupil expansion optics, light-scanning elements, occlusion mask.

Figure 24:
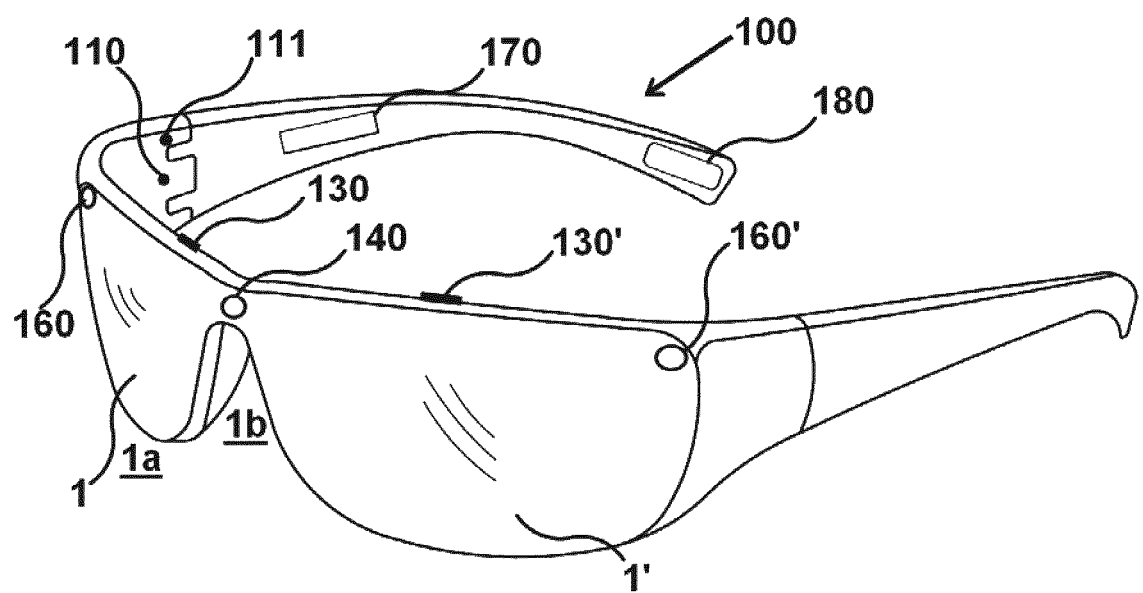
FIG. 24 shows a near-to-the-eye display apparatus.

The invention is also achieved by a near-eye display apparatus 100, illustrated in FIG. 24, comprising:
the optical combiner 1 as described before;
an image generating apparatus;
a head-fitting hardware on which said optical combiner 1 and image generating apparatus are fixed.

In an embodiment the near-eye display apparatus 100 comprises at least one of the following hardware elements:
a) an inertial measurement unit;
b) a solid-state memory storage 170;
c) a wireless datalink;
d) an eye tracking system 130;
e) a Central Processing Unit (CPU) 170;
f) a Graphics Processing Unit (GPU) 170;
g) a camera 160, 160' arranged to image the surrounding environment;
h) a depth-sensing camera 140 or optical system;
i) a battery 180.

It is understood that FIG. 24 illustrates an exemplary arrangement of said hardware arrangements and that other arrangements are possible, in particular the same number may identify different elements, for ex the CPU may be placed in the position of the battery or vice versa.

In an embodiment of the near-eye display apparatus 100 said light emitter 110 comprises a projector arranged to project, in operation, an image projected on to said waveguiding layer 20 impeding on said front side 1a or said back side 1b.

In an embodiment the near-eye display apparatus 100 comprises a microdisplay arranged to project, in operation, an image onto said waveguiding layer 20 impeding on said front side 1a or said back side 1b.

In an embodiment said light emitter 110 is a light beam scanner arranged to project, in operation, at least one light beam onto said waveguiding layer impeding from said front side 1a or said back side 1b.

In an embodiment said light emitter 110 comprises a microdisplay, a micro-projector or a light-beam scanner arranged to project, in operation, at least one light beam onto said waveguiding layer impeding through a lightguiding optical element.

Figure 20:
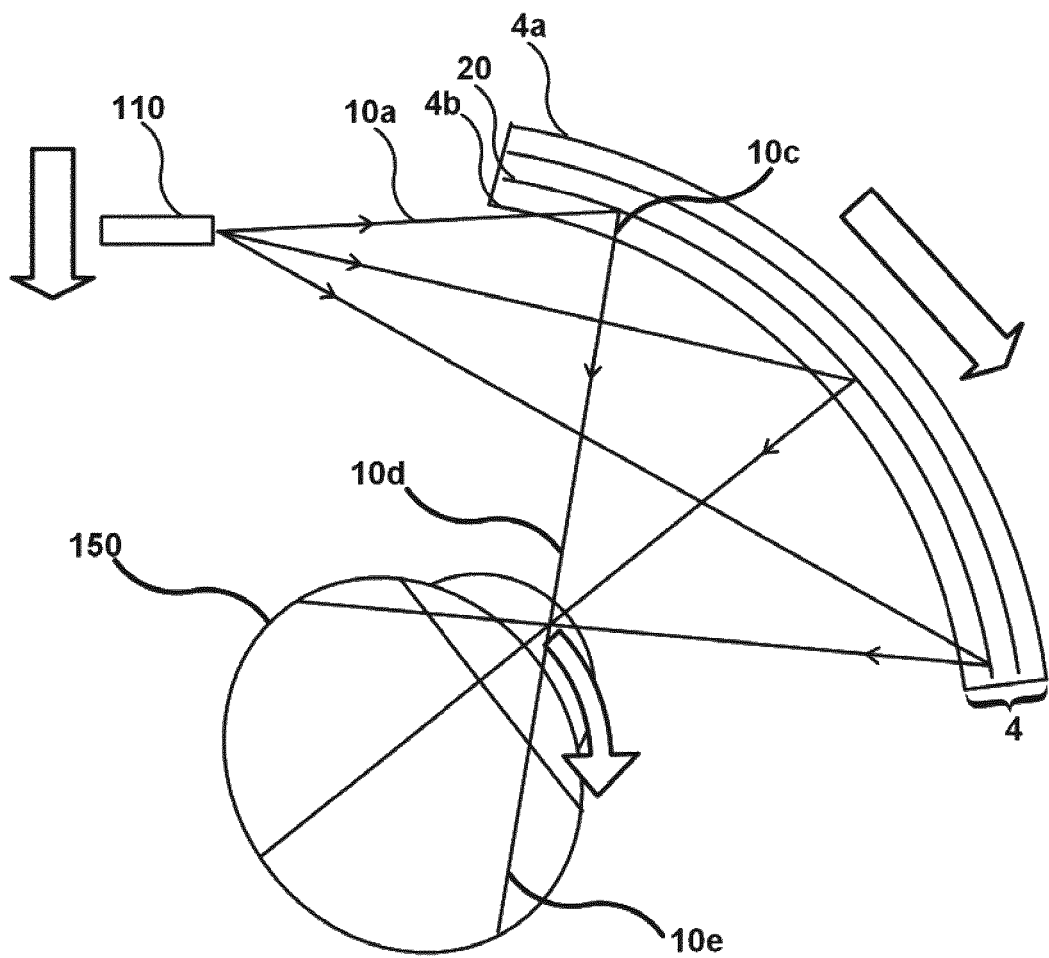
FIG. 20 illustrates an optical combiner configured to be translated or configured to receive light from a light emitter being translated in respect to the optical combiner.
Figure 21:
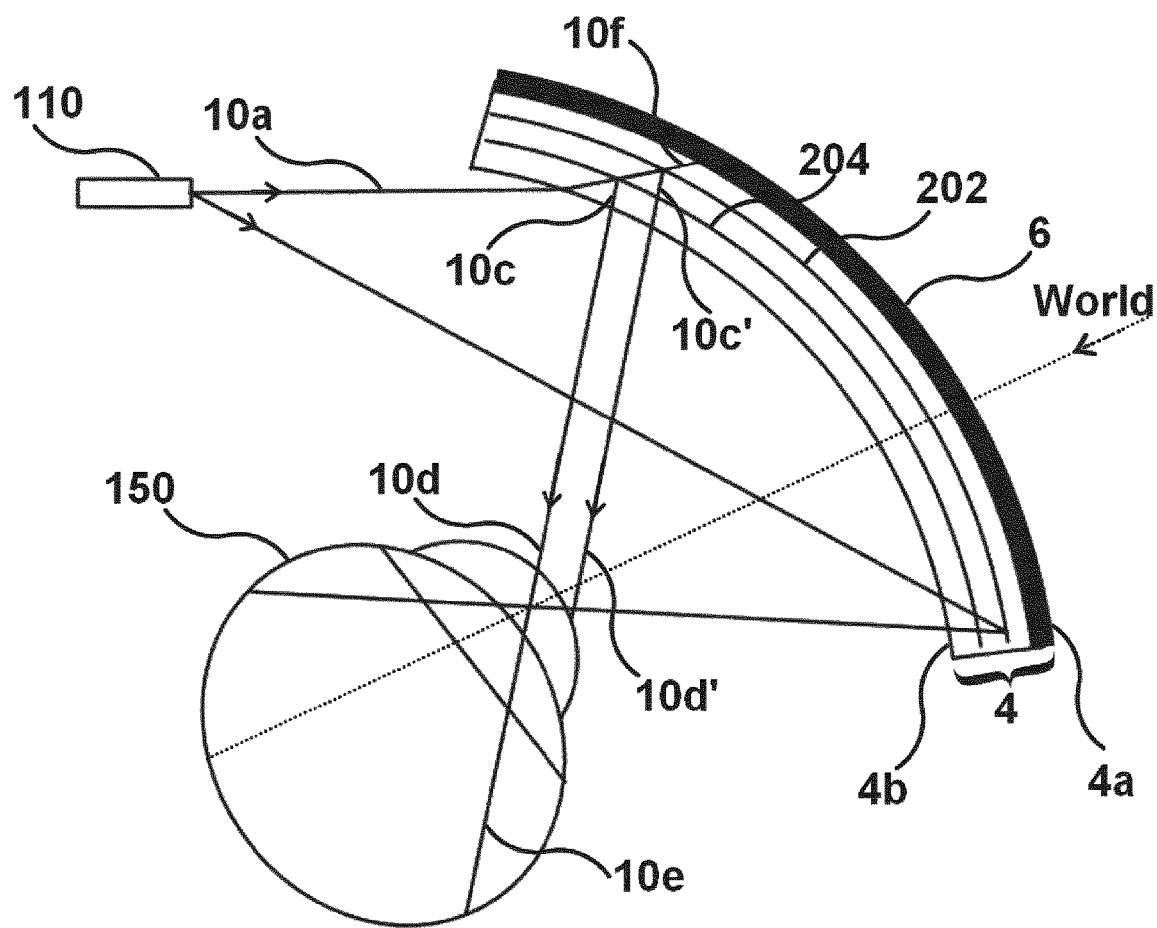
FIG. 21 illustrates an optical combiner comprising a plurality of waveguiding layers operating with light received from a common emitter and illustrates a selective absorption or reflection layer.

In an embodiment, illustrated in FIG. 20, the optical combiner 1 is adapted to move laterally, or said light emitter 110 is adapted to move compared to said combiner 1, or the polarization or spectral range of said light emitter 110 is tuned so as to be able to locate dynamically the exit pupil 3 at a determined location.

In an embodiment said light emitter 110 is adapted to emit non-planar optical wavefronts so as to simulate light emitted by objects located, to said front side 1a, at a finite distance.

In an embodiment the near-eye display apparatus 100 comprises an eye-tracking or gaze-tracking system connected to a CPU configured to determine the vergence point of the two eyes of an observer with respect to said headset and wherein the light emitter 110 is configured to blur virtual images of virtual objects depending on their distance from the sphere determined by being centered on the eye of an observer and containing said vergence point.

In an embodiment said eye-tracking system is configured to determine the position of the at least one pupil of the eye of an observer, the image generating apparatus being configured to project into the eye a plurality of beamlets 11c in said exit pupil 3 and so simulating the presence of a virtual object located at a finite distance from said observer.

In an embodiment the eye-tracking system is configured to determine the position of at least one pupil of the eye of an observer, wherein further the image generating apparatus is configured to project into the eye an outcoupled light beam 10c having a curved wavefront.

In an embodiment said eye-tracking system is configured to determine the position of at least one pupil of the eye of the user, the image generating apparatus being configured to adapt the orientation, position or spatial distribution of the emitted light beam 10, so that said at least one exit pupil is located at said at least one eye pupil.

In an embodiment said eye-tracking system comprises a light occlusion system as for example described in US2015/0241703 designed to reduce the brightness of light impeding from the outside world.

In an embodiment the occlusion system is adapted to occlude light dynamically and selectively according to its incidence direction of incidence.

What is claimed is:

1. An optical combiner, defining a front side and a back side opposite to said front side comprising:
   a substrate layer defining a front surface and a back surface, said front surface facing said front side;
   a waveguiding layer arranged on said substrate layer, having a predetermined permittivity function defined in a direction perpendicular to said waveguiding layer, and comprising an array of pairs of resonant waveguide gratings, each pair comprising a first resonant waveguide grating and a second resonant waveguide grating;
   said first resonant waveguide grating defining a first surface portion of said waveguiding layer having a first center and the second resonant waveguide grating defining a second surface portion of said waveguiding layer having a second center, said first center and said second center defining a local longitudinal axis W, and a resonant waveguide grating element center being defined halfway between said first center and said second center;

said first and second resonant waveguide grating being formed by respectively a first grating and a second grating, each grating being arranged to an adjacent portion of said waveguiding layer;

said first resonant waveguide grating being arranged to be in optical communication with said second resonant waveguide grating and wherein:

said waveguiding layer is configured to guide at most ten guided light modes in the visible wavelength range, said visible wavelength range being defined as light having a wavelength between 370 nm and 800 nm, said first grating and second grating having different grating vectors, said first grating has a predetermined period and orientation and wherein said permittivity function of the waveguiding layer is also chosen so that the said first resonant waveguide-grating element couples resonantly into said waveguiding layer an incoupled portion of an incident light beam, provided by a light emitter emitting a light beam, into at least one of said ten modes of the waveguiding layer, said second grating has a chosen period and orientation, and wherein said permittivity function of the waveguiding layer is also chosen so that said second resonant waveguide-grating element couples out resonantly of said waveguide layer, to said back side, an outcoupled fraction of said at least an incoupled portion, said outcoupled fraction of said at least incoupled portion has a predetermined wavelength $\lambda$, in said visible and near-infrared wavelength range and has a predetermined spectral width $\Delta\lambda$.

2. The optical combiner according to claim 1 wherein said waveguiding layer has a thickness, defined perpendicular to said waveguiding layer, is smaller than 2 μm, preferably smaller than 1 um, more preferably smaller than 500 nm and even more preferably smaller than 250 nm.

3. The optical combiner according to claim 1 wherein a distance between the centers of said at least a pair of resonant waveguide grating elements is less than 1 millimeter, preferably less than 200 um, preferably less than 50 μm, more preferably less than 30 μm.

4. The optical combiner (1) according to claim 1 wherein said first resonant waveguide-grating element is arranged to couple resonantly into said waveguiding layer at least a first incoupled portion of an incident light beam, the resonant incoupling forming a leaky mode in the first resonant waveguide-grating element.

5. The optical combiner according to claim 1, wherein at least one of said incoupled portions propagates in said waveguiding layer in the fundamental mode of the waveguiding layer, this mode being either the fundamental transverse electric mode (TE0) or the fundamental transverse magnetic mode (TM0).

6. The optical combiner according to claim 1 wherein said waveguiding layer is homogenous (DD) in the areas of said waveguiding layer comprising a plurality of resonant waveguide grating elements.

7. The optical combiner according to claim 1 wherein said incoupled portion is incoupled according to a low diffraction mode of said first grating, preferably either the +1 or −1 diffraction order.

8. The optical combiner according to claim 1 wherein said outcoupled fraction is outcoupled according to a low diffraction mode of said second grating, preferably the +1 or −1 diffraction order.

9. The optical combiner according to claim 1 wherein said predetermined wavelength $\lambda$ is comprised between 380 nm and 1200 nm and in that said predetermined spectral width $\Delta\lambda$, defined as being a full width half maximum of the optical spectrum of said outcoupled fraction, is less than 100 nm, preferably less than 80 nm, more preferably less than 50 nm.

10. The optical combiner according to claim 1 wherein the waveguiding layer comprises a high refractive index material.

11. The optical combiner according to claim 1 wherein an exit pupil is defined to the side of said back side at a predetermined location L to said optical combiner, said optical combiner being adapted so that at least an outcoupled portion of said at least one outcoupled fraction is propagating to and incident at the location of said exit pupil.

12. The optical combiner according to claim 11, wherein said array is arranged so that when an eye of an observer is located at said exit pupil, at least a part of said outcoupled portion is incident on the retina of the eye of an observer.

13. The optical combiner according to claim 11 wherein said array is arranged to redirect, onto said exit pupil, a portion of a plurality of incident light beams provided by an array of lightbeams, each lightbeam being impeding on various locations of the optical combiner.

14. The optical combiner according to claim 1 wherein at least an outcoupled fraction is propagating away from a specular reflected fraction of said incident light beam on said waveguiding layer and away from any transmitted fraction of said incident light beam that is transmitted through the waveguiding layer.

15. The optical combiner according to claim 1 wherein at least a fraction of said incident beam is incident on said back side.

16. The optical combiner according to claim 1 wherein said incident light beam is incident on said front side.

17. The optical combiner according to claim 1 adapted to receive incident light provided by a light emitter, said incident light being guided by a lightguiding optical element arranged between said light emitter and said array.

18. The optical combiner according to claim 17 wherein said lightguiding optical element has a thickness, perpendicular to said lightguide, of more than 50 μm and/or is highly multimode.

19. The optical combiner according to claim 1 adapted to receive incident light provided by a light emitter, said incident light being travelling in free-space before impeding on the waveguiding layer.

20. The optical combiner according to claim 1 wherein its transparency, defined in the direction perpendicular to said waveguiding layer, in said visible wavelength range is higher than 50%, preferably higher than 70%, even more preferably higher than 80% for light provided by a light source facing said front side.

21. The optical combiner according to claim 1 wherein said array comprises different subsets of resonant waveguide grating pairs, the subsets being configured to provide each an outcoupled fraction of light having a different central wavelength.

22. The optical combiner according to claim 1 wherein at least three different subsets are configured to provide each an outcoupled fraction having different spectral widths.

23. The optical combiner according to claim 21 wherein said subsets are located in a single waveguiding layer.

24. The optical combiner according to claim 21 wherein at least one of the subsets is located in a second waveguiding layer arranged on said substrate layer.

25. The optical combiner according to claim 1 wherein said waveguiding layer comprises at least a first, a second and a third waveguiding layer, said first waveguiding layer comprising a first array configured to provide an outcoupled fraction of red light, said second waveguiding layer comprising a second array a configured to provide an outcoupled fraction of green light and said third waveguiding comprising a third array configured to provide an outcoupled fraction of blue light.

26. The optical combiner according to claim 11 configured to project virtual images, provided by said light emitter onto said exit pupil, said images containing, in a light-field display configuration, pixels in virtual image planes at different focal distances from said optical combiner.

27. The optical combiner according to claim 11, wherein said array comprises at least two subsets of grating pair arrays, each subset being configured to direct to said exit pupil an imaging light beam comprising one of images provided by said light emitter configured to provide at least two images at two different focal distances from said optical combiner 1.

28. The optical combiner according to claim 11 configured to have a subset of said array, each of said subset of the array coupling out of said waveguiding layer outcoupled beamlets, beam having a cross-section smaller than 0.5 mm, preferably smaller than 0.2 mm, more preferably smaller than 0.1 mm, said cross section being defined at any location of the light beam between said second grating and said virtual exit pupil.

29. The optical combiner according to claim 28 configured so that said beamlets have each a parallel collimation and a cross-section so that when an eye of an observer is located at said virtual exit pupil the focal plane of the virtual source of said beamlets cannot be resolved.

30. The optical combiner according to claim 1 wherein at least a subset of said array is configured to reflect or transmit outcoupled light beams having non-planar wavefronts.

31. The optical combiner according to claim 1 wherein at least a subset of said array is configured so that at least one of said outcoupled fractions has a different wavefront than the wavefront of said incident light beam.

32. The optical combiner according to claim 1 wherein said first grating and/or said second grating is a non-linear grating.

33. The optical combiner according to claim 1 wherein said first grating and/or said second grating is a non-continuous grating.

34. The optical combiner according to claim 1 wherein said waveguiding layer has a pre-determined complex 3D curved surface.

35. The optical combiner according to claim 11 comprising an index layer comprising means to modulate its refractive index, so as to enable to modify dynamically the position of said exit pupil.

36. The optical combiner according to claim 11 wherein at least two said second gratings outcouple at least two light beam fractions, said array being configured so that said at least two divergent light beam fractions appear to be provided by a single point source to an observer whose pupil is located at said exit pupil.

37. The optical combiner according to claim 11 wherein at least two subsets of said pair are configured so that image-containing incident light beams provided from various light emitters are at least partially outcoupled by said array and directed on said exit pupil and so that the perceived images by an observer are stitched laterally so as to increase the resolution and/or the field of view of the perceived images by an observer whose pupil is located at said exit pupil.

38. The optical combiner according to claim 11 wherein at least two subsets of said array are configured so that image-containing outcoupled light beams provided from a plurality of light emitters and outcoupled towards said exit pupil appear to be provided by virtual sources located at different focal distance from said exit pupil.

39. The optical combiner according to claim 11 comprising a plurality of waveguiding layers, each waveguiding layer comprising at least one of said arrays configured to provide outcoupled fractions that are spatially separated so as to enhance the aperture of said exit pupil.

40. The optical combiner according to claim 1 comprising a plurality of subset of said array configured so that said outcoupled fraction, each provided by incident light beams that are spectrally or angularly separated, are spatially separated so that an exit pupil has a greater aperture.

41. The optical combiner according to claim 1 wherein said array is arranged so that at least two exit pupils are defined so that each of the two eyes of an observer can be positioned in the location of said two exit pupils, and so that at least a part of said outcoupled portion is incident on the retina of each eye of an observer.

42. A near-eye display apparatus comprising:
   the optical combiner according to claim 1;
   an image generating apparatus;
   a head fitting hardware on which said optical combiner and image generating apparatus are fixed.

43. The near-eye display apparatus according to claim 42 comprising at least one of the following hardware elements:
   a) an inertial measurement unit;
   b) a solid-state memory storage;
   c) a wireless datalink;
   d) an eye tracking system;
   e) a CPU;
   f) a GPU;
   g) a camera arranged to image the surrounding environment;
   h) a depth-sensing camera or optical system;
   i) a battery.

44. The near-eye display apparatus according to claim 42 wherein said light emitter comprises a projector arranged to project, in operation, an image projected on to said waveguiding layer impeding on said front side or back side.

45. The near-eye display apparatus according to claim 42 wherein said light emitter comprises a microdisplay arranged to project, in operation, an image onto said waveguiding layer impeding on said front side or back side.

46. The near-eye display apparatus according to claim 42 wherein said light emitter is a light beam scanner arranged to project, in operation, at least one light beam onto said waveguiding layer impeding from said front side or said back side.

47. The near-eye display apparatus according to claim 42 wherein said light emitter comprises a microdisplay, a micro-projector or a light-beam scanner arranged to project, in operation, at least one light beam onto said waveguiding layer impeding through a lightguiding optical element.

48. The near-eye display apparatus according claim 42 wherein said optical combiner is adapted to move, or said light emitter is adapted to move, or said emitter laterally to locate dynamically the virtual exit pupil at a determined location.

49. The near-eye display apparatus according to claim 42 wherein said light emitter is adapted to emit non-planar optical wavefronts so as to simulate light emitted by objects located, to said front side, at a finite distance.

50. The near-eye display apparatus according to claim 42 wherein an eye-tracking system is connected to a CPU configured to determine the vergence point of the two eyes of an observer with respect to said near-eye display apparatus and wherein the light emitter is configured to blur virtual images of virtual objects depending on their distance from the sphere determined by being centered on the eye of an observer and containing said vergence point.

51. The near-eye display apparatus according to claim 42 wherein said eye-tracking system is configured to determine the position of the at least one pupil of the eye of an observer, the image generating apparatus being configured to project into the eye a plurality of beamlets in said exit pupil and so simulating the presence of a virtual object located at a finite distance from said observer.

52. The near-eye display apparatus according to claim 42, wherein the eye-tracking system is configured to determine the position of at least one pupil of the eye of an observer, wherein further the image generating apparatus is configured to project into the eye an outcoupled light beam having a curved wavefront.

53. The near-eye display apparatus according to claim 42 wherein said eye-tracking system is configured to determine the position of at least one pupil of the eye of the user, the image generating apparatus being configured to adapt the orientation, position or spatial distribution of the emitted light beam, so that said at least one virtual exit pupil is located at said at least one eye pupil.

54. The near-eye display apparatus according to claim 42 wherein said eye-tracking system comprises a light occlusion system designed to reduce the brightness of light impeding from the outside world.

55. The near-eye display apparatus according to claim 54 wherein the occlusion system is adapted to occlude light dynamically and selectively according to its direction of incidence.

* * * * *